US010739823B2

(12) United States Patent
Gordon et al.

(10) Patent No.: US 10,739,823 B2
(45) Date of Patent: Aug. 11, 2020

(54) MOTION CONTROL ASSEMBLY WITH BATTERY PACK

(71) Applicant: Ultrahaptics IP Two Limited, Bristol, OT (GB)

(72) Inventors: Robert Samuel Gordon, Pacifica, CA (US); Paul Alan Durdik, Foster City, CA (US)

(73) Assignee: Ultrahaptics IP Two Limited, Bristol (GB)

( * ) Notice: Subject to any disclaimer, the term of this patent is extended or adjusted under 35 U.S.C. 154(b) by 0 days.

(21) Appl. No.: 16/153,578

(22) Filed: Oct. 5, 2018

(65) Prior Publication Data
US 2019/0094909 A1    Mar. 28, 2019

Related U.S. Application Data

(63) Continuation of application No. 15/677,880, filed on Aug. 15, 2017, now Pat. No. 10,095,269, which is a
(Continued)

(51) Int. Cl.
*G06F 3/01* (2006.01)
*G06F 3/16* (2006.01)
(Continued)

(52) U.S. Cl.
CPC .......... *G06F 1/1635* (2013.01); *G06F 1/1694* (2013.01); *G06F 1/3212* (2013.01);
(Continued)

(58) Field of Classification Search
CPC ........ G06F 3/01; G06F 1/1613; G06F 1/1694; G06F 1/1635; G06F 1/3212; G06F 3/011; G06F 3/017; G06F 3/042
See application file for complete search history.

(56) References Cited

U.S. PATENT DOCUMENTS 7,163,231 B2    1/2007  Kumagai
8,935,438 B1    1/2015  Ivanchenko
(Continued)

OTHER PUBLICATIONS

U.S. Appl. No. 14/589,761—Office Action dated Nov. 16, 2016, 23 pages.
(Continued)

*Primary Examiner* — Md Saiful A Siddiqui
(74) *Attorney, Agent, or Firm* — Haynes Beffel & Wolfeld, LLP; Ernest J. Beffel, Jr.; Paul A. Durdik

(57) ABSTRACT

A motion control assembly includes a motion control device electrically connected to a battery pack and to a mobile computing device for at least data transmission therebetween. The motion control device can generate inputs, such as inputs corresponding to an attribute of a sensed object, for transmission to the mobile computing device. The drain on a battery of a battery-powered mobile computing device can be reduced when used with a motion control device as follows. A motion control assembly, comprising a motion control device and a battery pack, capable of powering the motion control device, as an integral, one-piece unit, is selected. The motion control device is connected to an electrical connector of a battery-powered mobile computing device. The motion control device is supplied with power from the battery pack during use so the motion control device can be operated using the power from the battery pack.

11 Claims, 12 Drawing Sheets

Related U.S. Application Data continuation of application No. 14/589,761, filed on Jan. 5, 2015, now Pat. No. 9,740,242.

(60) Provisional application No. 61/924,088, filed on Jan. 6, 2014.

(51) Int. Cl.

| | |
|---|---|
| *G06F 1/16* | (2006.01) |
| *G06F 1/3212* | (2019.01) |
| *G06F 3/042* | (2006.01) |
| *H04M 1/725* | (2006.01) |
| *H02J 7/35* | (2006.01) |
| *H02J 50/10* | (2016.01) |
| *H02J 7/00* | (2006.01) |

(52) U.S. Cl.
CPC ............ *G06F 3/011* (2013.01); *G06F 3/017* (2013.01); *G06F 3/042* (2013.01); *H04M 1/72527* (2013.01); *H02J 7/00* (2013.01); *H02J 7/35* (2013.01); *H02J 50/10* (2016.02); *H02J 2207/40* (2020.01); *Y02D 10/174* (2018.01)

(56) References Cited

U.S. PATENT DOCUMENTS

| | | | |
|---|---|---|---|
| 9,401,977 B1* | 7/2016 | Gaw | ............... G01N 21/84 |
| 2002/0021275 A1 | 2/2002 | Kataoka et al. | |
| 2008/0055318 A1 | 3/2008 | Glen | |
| 2009/0075687 A1* | 3/2009 | Hino | .................. H05K 999/99 |
| | | | 455/517 |
| 2010/0066677 A1 | 3/2010 | Garrett et al. | |
| 2011/0021255 A1 | 1/2011 | Kim et al. | |
| 2011/0134251 A1 | 6/2011 | Kim et al. | |
| 2011/0136555 A1 | 6/2011 | Ramies et al. | |
| 2011/0187489 A1* | 8/2011 | Lee | ...................... G05B 23/02 |
| | | | 340/3.1 |
| 2011/0296353 A1 | 12/2011 | Ahmed et al. | |
| 2012/0206414 A1 | 8/2012 | Tada et al. | |
| 2013/0222611 A1 | 8/2013 | Hsu et al. | |
| 2014/0145914 A1* | 5/2014 | Latta | ................... G06F 1/3215 |
| | | | 345/8 |
| 2015/0192987 A1 | 7/2015 | Gordon et al. | |
| 2016/0134152 A1 | 5/2016 | Tuli et al. | |

OTHER PUBLICATIONS

U.S. Appl. No. 14/589,761—Notice of Allowance dated Apr. 3, 2017, 11 pages.

U.S. Appl. No. 14/589,761—Response to Office Action dated Nov. 16, 2016 filed Jan. 11, 2017, 9 pages.

U.S. Appl. No. 15/677,880—Office Action dated Dec. 28, 2017, 23 pages.

U.S. Appl. No. 15/677,880—Response to Office Action dated Dec. 28, 2017, filed Mar. 6, 2018, 7 pages.

U.S. Appl. No. 15/677,880—Notice of Allowance dated Jun. 5, 2018 8 pages.

* cited by examiner

MOTION CONTROL ASSEMBLY WITH BATTERY PACK

CROSS-REFERENCE TO OTHER APPLICATIONS

This application is a continuation of U.S. patent application Ser. No. 15/677,880, filed on 15 Aug. 2017, entitled "MOTION CONTROL ASSEMBLY WITH BATTERY PACK", which is a continuation of U.S. patent application Ser. No. 14/589,761, filed on 5 Jan. 2015, entitled "MOTION CONTROL ASSEMBLY WITH BATTERY PACK", now U.S. Pat. No. 9,740,242 issued on 22 Aug. 2017, which claims the benefit of U.S. Provisional Patent Application No. 61/924,088, filed 6 Jan. 2014, entitled "MOTION CONTROL ASSEMBLY WITH BATTERY PACK." The non-provisional and provisional applications are hereby incorporated by reference for all purposes.

BACKGROUND

Motion control devices have been developed to allow a user to provide input to a computing device, such as a desktop computer, a laptop computer, or a pad computer, without the need for physical interaction with an input device, such as a keyboard, a computer mouse, a touchscreen interface, or a laser pointer used with a radiation-sensitive screen. One example of a motion control device is that sold by Leap Motion, Inc. of San Francisco, Calif., as the Leap Motion Controller. It can create three-dimensional images of a user's hands and fingers to permit input to the computing device without the need for physical contact. Briefly, it includes a pair of cameras for acquiring images of an object, a number of LED light source used to illuminate the object, and a computer for processing the images to identify and/or characterize the object. A computer display may be used for displaying information related to the identified/characterized object. Another motion control device is Kinect from Microsoft Corporation, for game consoles and computers. Other motion control devices have been developed for game consoles, including Wii Remote Plus for Wii from Nintendo Corporation, and PlayStation Camera for PlayStation 4 from Sony Computer Entertainment.

SUMMARY OF THE TECHNOLOGY DISCLOSED

The technology disclosed relates to a substitute motion control assembly for use with a mobile computing device and a method for reducing the drain on the battery of a battery-powered mobile computing device when used with a motion control assembly.

An implementation of a motion control assembly is usable with a mobile computing device of the type having a computing device electrical connector. The motion control assembly includes a motion control device, a battery pack connected to the motion control device to supply power thereto, and a coupler to electrically connect the motion control device to the computing device electrical connector for at least data transmission between.

Implementations of the motion control assembly can include one or more of the following. The motion control device can generate inputs for transmission to the mobile computing device; the inputs can correspond to an attribute of a sensed object. The battery pack and the motion control device can be separate components or they can form an integral unit. The motion control assembly can include a protective case configured for mounting to a mobile computing device, with a portion of the protective case carrying the motion control device, battery pack and coupler as a one-piece unit. The motion control device can include an objects of interest determiner to detect the existence of a low power required condition, and a command engine to provide instructions to at least one of an emission module and a detection module indicating a low power mode of operation is to be entered. An environmental filter can be used to provide environmental information comprising an input power level and power source type to the command engine. The motion control device can adapt detection of objects to at least one of an input power level and a power source type.

An implementation of a first method for reducing the drain on a battery of a battery-powered mobile computing device when used with a motion control device is carried out as follows. A motion control assembly, comprising a motion control device and a battery pack as an integral, one-piece unit, is selected, the motion control device being capable of being powered by the battery pack. The motion control device is connected to an electrical connector of a battery-powered mobile computing device. The motion control device is supplied with power from the battery pack during use of the motion control device. The motion control device can be operated using the power from the battery pack.

Implementations of the first drain reducing method can include one or more of the following. The motion control assembly selecting step can include selecting a rechargeable battery pack. The method can further comprise supplying energy to the battery pack using at least one of a recharging cable, a solar panel, and an inductive charger. The motion control device operating step can be carried out with the motion control device using no power from the mobile computing device. The method can further include determining if a low power required condition exists, and if so provide instructions, by a command engine of the motion control assembly, to at least one of an emission module and a detection module of the motion control assembly indicating a low power mode of operation is to be entered; environmental information, comprising an input power level and power source type, can be provided to the command engine. Detection of objects can be adapted to at least one of an input power level and a power source type.

An implementation of a second example of a method for reducing the drain on a battery of a battery-powered mobile computing device when used with a motion control device is carried out as follows. A motion control assembly, comprising a motion control device and a battery pack as an integral, one-piece unit, is provided, with the motion control device being capable of being powered by the battery pack. A user is instructed to (1) connect the motion control device to an electrical connector of a battery-powered mobile computing device, and (2) operate the motion control device with power from the battery pack during use of the motion control device.

Implementations of the second drain reducing method can include one or more the following. The motion control assembly providing step can include selecting a rechargeable battery pack. The method can further include supplying energy to the battery pack using at least one of a recharging cable, a solar panel, and an inductive charger. The motion control device operating step can be carried out with the motion control device using no power from the mobile computing device. The motion control device operating step can further include (1) determining if a low power required condition exists, and (2) if such condition exists, provide instructions, by a command engine of the motion control assembly, to at least one of an emission module and a detection module of the motion control assembly indicating a low power mode of operation is to be entered. The motion control device operating step can further include providing environmental information, comprising an input power level and power source type, to the command engine. Detection of objects can be adapted to at least one of an input power level and a power source type.

Other features, aspects and advantages of implementations of this disclosure can be seen on review the drawings, the detailed description, and the claims which follow.

DESCRIPTION

Figure 1:
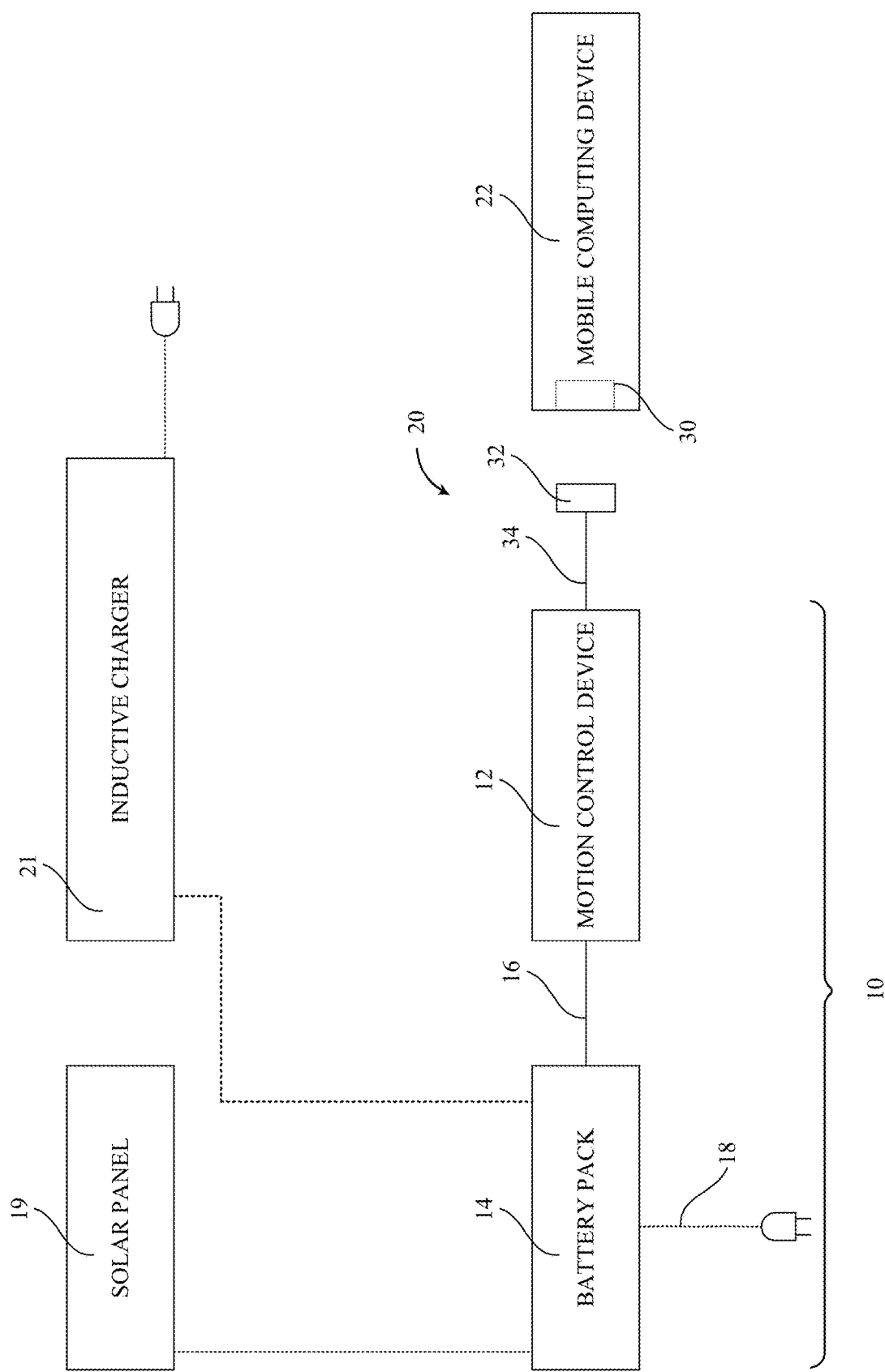
FIG. 1 is a schematic diagram illustrating a motion control assembly used with a mobile computing device.

The following description will typically be with reference to specific structural embodiments and methods. It is to be understood that there is no intention to limit the disclosed technology to the specifically disclosed embodiments and methods but that the disclosed technology may be practiced using other features, elements, methods and embodiments. Some of the many features and benefits of the disclosed technology are illustrated with reference to disclosed embodiments, however it is understood that the embodiments disclosed are merely examples and do not limit the scope of the technology disclosed. Those of ordinary skill in the art will recognize a variety of equivalent variations on the description that follows. Unless otherwise stated, in this application specified relationships, such as parallel to, aligned with, or in the same plane as, mean that the specified relationships are within limitations of manufacturing processes and within manufacturing variations. When components are described as being coupled, connected, being in contact or contacting one another, they need not be physically directly touching one another unless specifically described as such. Like elements in various embodiments are commonly referred to with like reference numerals.

Aspects of the systems and methods described herein provide for determining positional information (e.g., location, and/or orientation) for at least a portion of a target object within a field of view. Among other aspects, embodiments can enable objects and/or features of an object surface to be automatically (e.g. programmatically) determined using positional information in conjunction with receiving input, commands, communications and/or other user-machine interfacing, gathering information about objects, events and/or actions existing or occurring within an area being explored, monitored, or controlled, and/or combinations thereof.

Many motion control devices are powered through the computing device with which they are used, typically through a USB or other type data connection providing both power to the motion control device and data transfer between the computing device and the motion control device. While computation-intensive motion control devices, such as the Leap Motion Controller referred to above, are well-suited for use with desktop computers and other computing devices connected to an electric outlet, when used with a battery-powered computing device they can draw down the battery of the computing device at an undesirable rate. Motion control assembly 10 of FIG. 1, discussed below, address this problem.

A motion control assembly 10 is shown in FIG. 1 to include a motion control device 12, also referred to below as a Machine Sensory and Control System (MSCS), connected to and powered by a battery pack 14 through a connection 16. The batteries within battery pack 14 can be removable and replaceable. Also, assembly 10 can include a recharging cable 18 when battery pack 14 is a rechargeable battery pack. In some examples, the motion control device 12 can be powered by two or more sources. For example, instead of or in addition to recharging cable 18, assembly 10 can include a solar panel 19 for recharging battery pack 14, or supplying power to motion control device 12, or both. Also, battery pack 14 can also be recharged using an inductive charger 21. In some examples, assembly 10 can switch between available power sources based upon the perceived availability of power from each source. Assembly 10 also includes a coupler 20 used to connect assembly 10 to a mobile computing device 22. Coupler 20 is used for data transmission between motion control device 12 and mobile computing device 22. In some examples, coupler 12 can also be used to transmit electric current from battery pack 14 to mobile computing device 22 according to the amount of illumination required to be created by motion control assembly 10

In some examples, the level of charge of battery pack 14 can be indicated by motion control assembly 10, such as through the use of a series of different colored lights which are illuminated according to the charge level, or through the use of a light which blinks and off according to the charge level. The charge level could also be provided to mobile computing device 22 for display by the mobile computing device. In some examples, motion control assembly 10 can select the rate at which charge is drawn from battery pack 14 according to the amount of illumination required to be created by motion control assembly 10 based in part on properties of the tracked object, such as how fast the tracked object is moving, where the tracked object is, the amount of ambient light, etc.

Mobile computing device 22 is a battery-powered computing device and can be, for example, a laptop computer, a tablet or pad computer, what is commonly referred to as a smart phone, or a smart watch. While mobile computing device 22 is battery-powered, many mobile computing devices 22 can be used while connected to an electric outlet so as not to rely on battery power alone. However, when mobile computing device 22 is not or cannot be connected to an electrical outlet, battery pack 14 helps to eliminate or at least reduce the premature exhaustion of the battery within mobile computing device 22 during use of motion control device 12. In some examples, battery pack 14 can be used to supply current not only to motion control device 12 but also to mobile computing device 22. In some examples, this can occur with or without recharging cable 18 connected to an electrical outlet. In some examples, battery pack 14 can supply current to mobile computing device 22 only when mobile control device 12 is not being used while in other examples, current can be supplied by battery pack 14 to both motion control device 12 and mobile computing device 22 during use of motion control device 12.

Figure 2A:
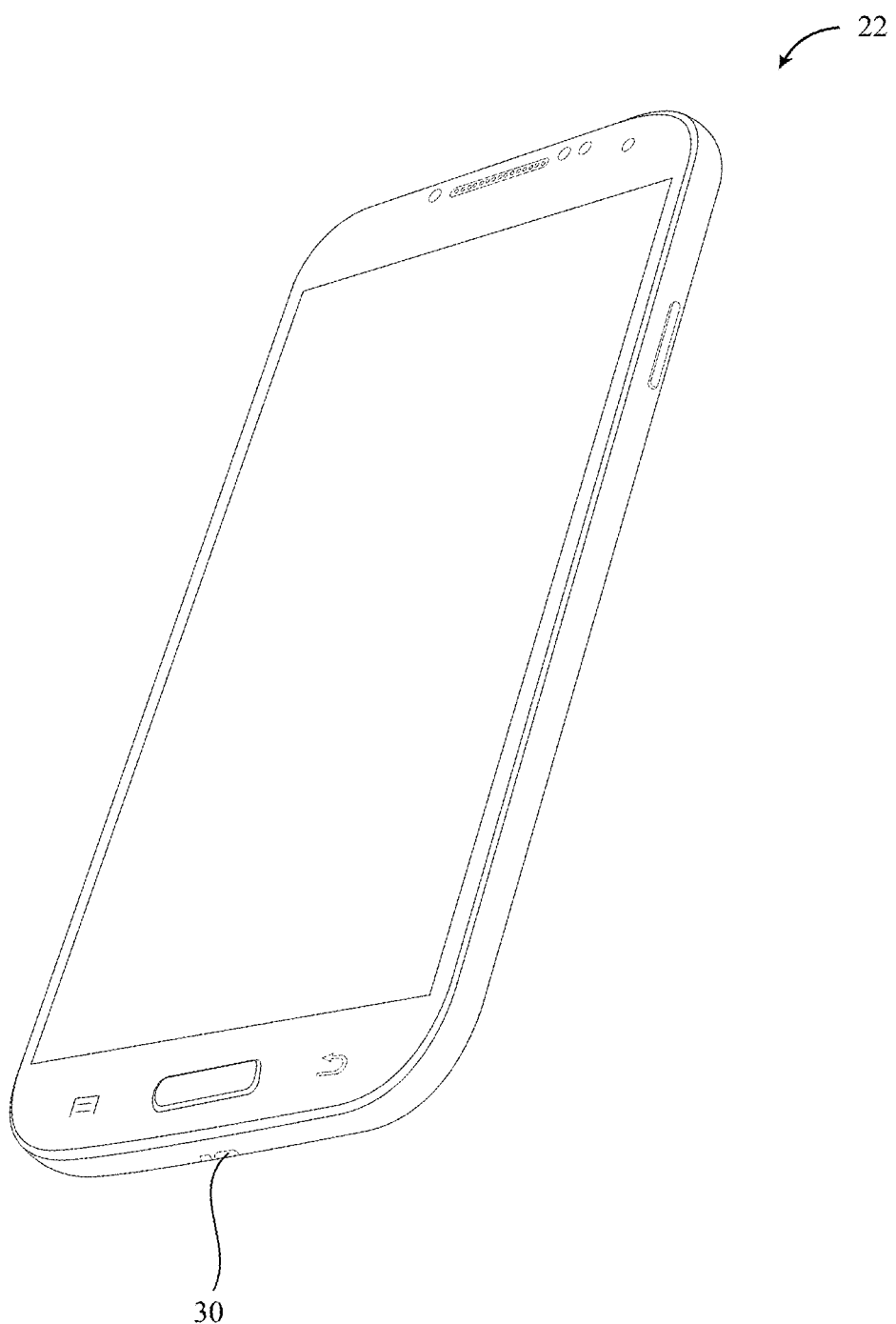
FIG. 2A is an isometric view of one example of a smart phone type of mobile computing device.
Figure 2B:
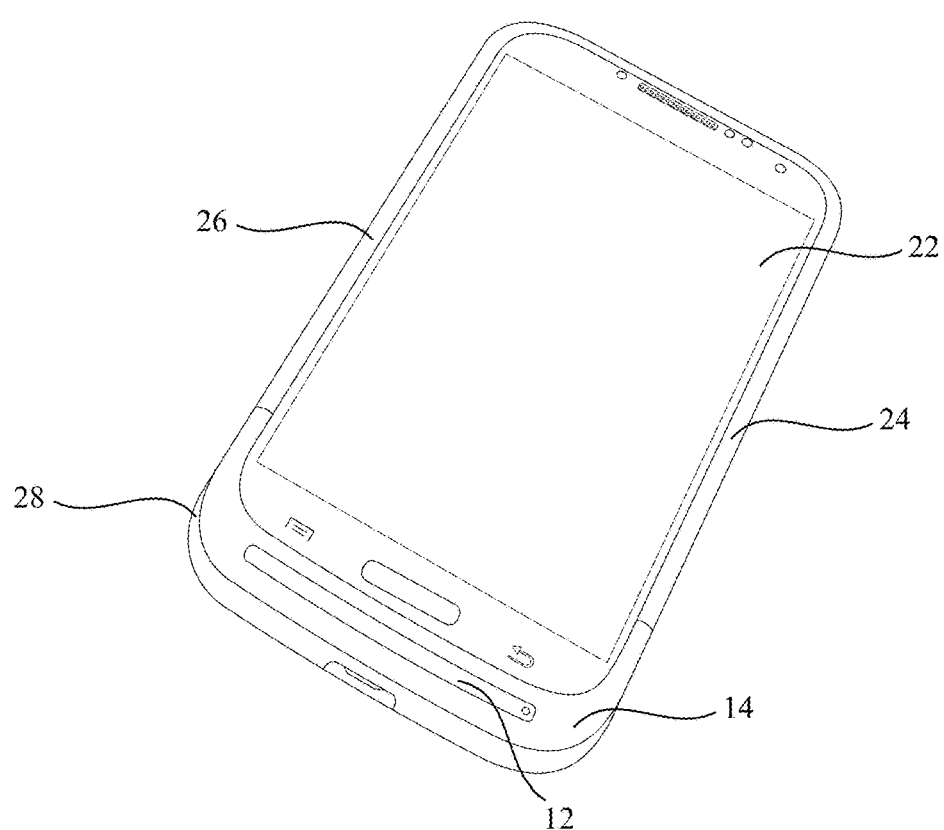
FIG. 2B illustrates an example of a motion control assembly including a two-piece protective case shown mounted to the smart phone type of mobile computing device of FIG. 2A.
Figure 2C:
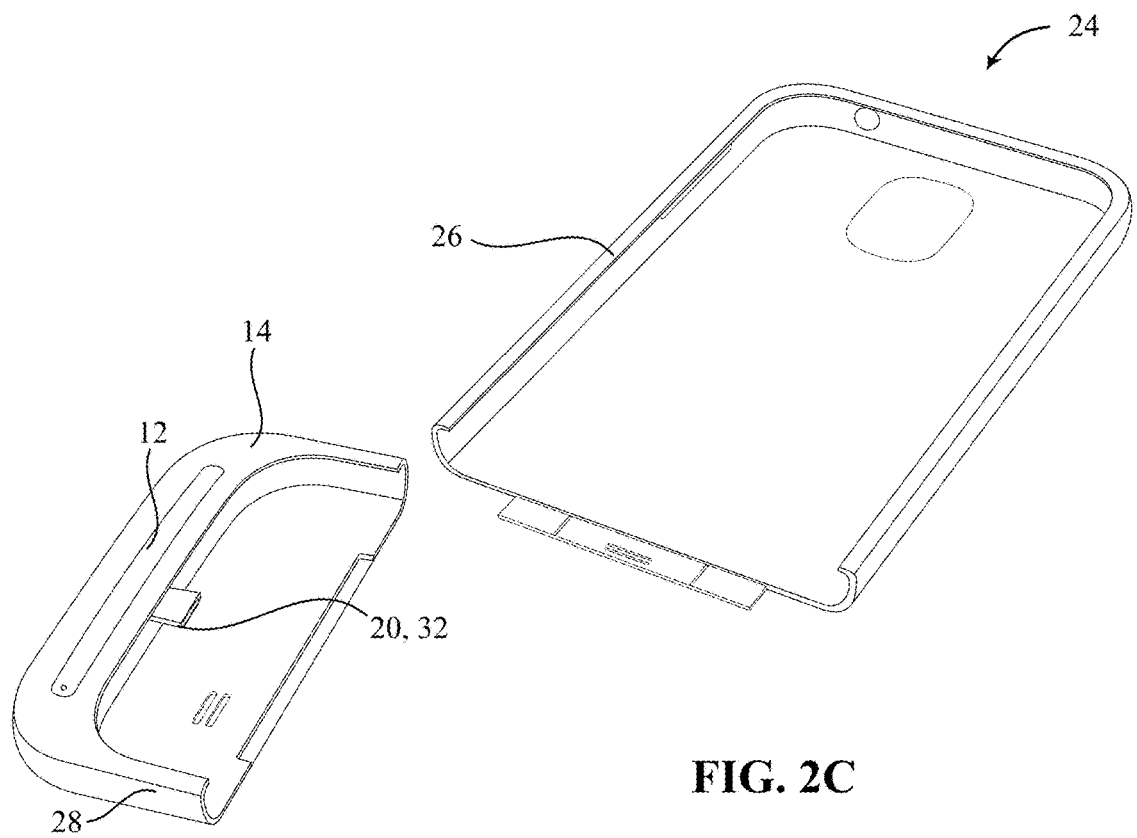
FIG. 2C is an exploded isometric view of the motion control assembly of FIG. 2B.

FIG. 2A is an isometric view of one example of a smart phone type of mobile computing device 22. FIG. 2B illustrates one example of a motion control assembly 10 used with the smart phone type of mobile computing device 22 of FIG. 2A. Motion control assembly 10 includes a two-piece protective case 24, see FIG. 2C, including a main portion 26, with motion control device 12, battery pack 14 and coupler 20, and an end portion 28 which fits together with main portion 26 to capture mobile computing device 22 therebetween and cause coupler 20 to mate with the computing device electrical connector 30.

Figure 3:
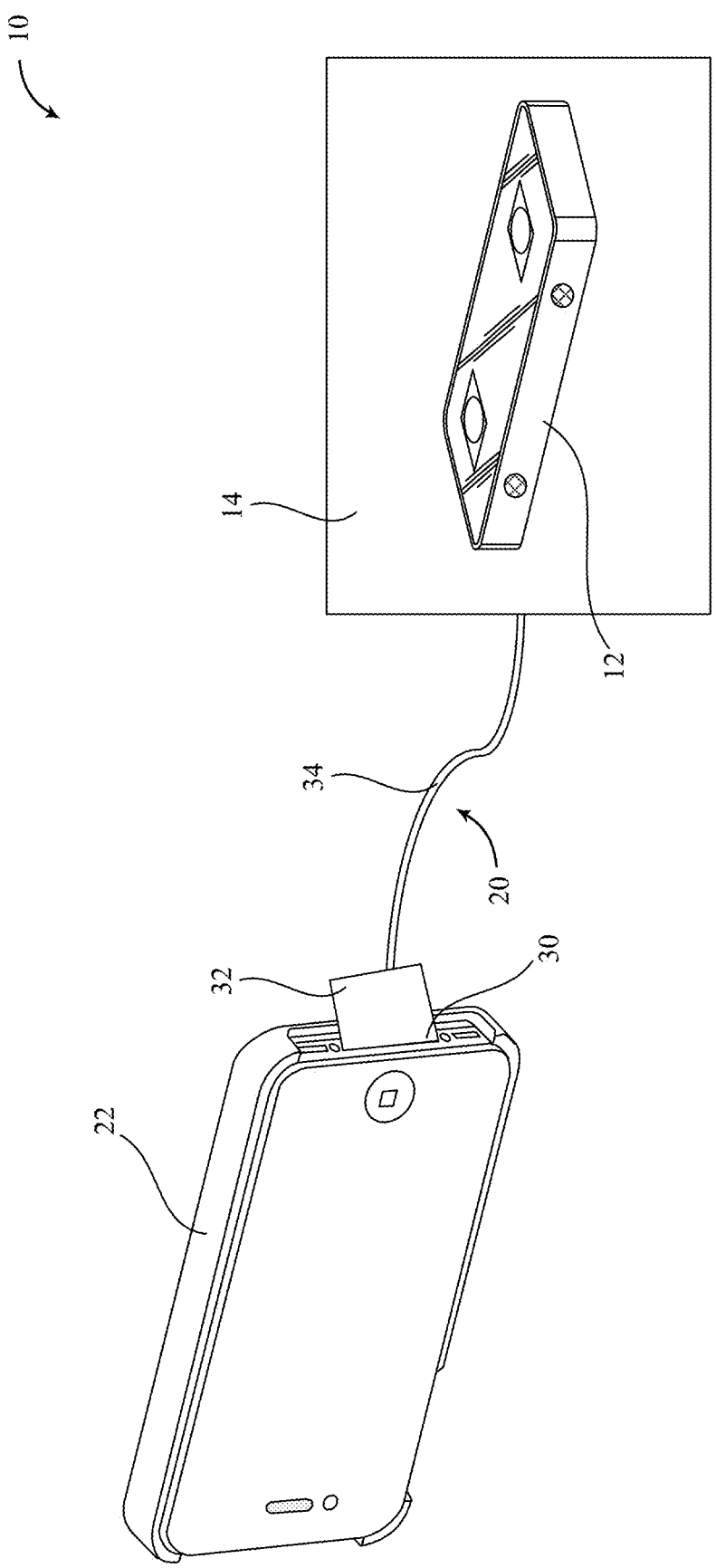
FIG. 3 shows another example of a motion control assembly with the motion control device and battery pack separated from the smart phone type of mobile computing device.

FIG. 3 illustrates another example of a motion control assembly 10 in which motion control device 12 and battery pack 14 are an integral package but are separated from mobile computing device 22. In this example, coupler 20 is in the form of a plug 32 at the end of a power and data cable 34.

A detailed description of an example of a motion control device 12 is described below in the section entitled Overview of Machine Sensory and Control Systems. The description starts with a discussion of FIG. 4.

The following examples of methods for reducing battery drain of a battery-powered mobile computing device 22, such as a laptop computer, tablet computer, smart phone, or smart watch, will be described with reference to the examples of FIGS. 1, 2B and 3 but with no intention to limit the methods to those specific examples.

In some examples, the drain on a battery of a battery-powered mobile computing device 22, when used with a motion control device 12, can be reduced in the following manner. A motion control assembly 10, comprising a motion control device 12 and a battery pack 14 as an integral, one-piece unit, is selected. In some examples, a motion control assembly 10 can be selected in which battery pack 14 is coupled to but separable from motion control device 12, such as by using a plug connection. The motion control device is capable of being powered by the battery pack. The motion control device 12 is connected to an electrical connector 30 of a battery-powered mobile computing device 22. The motion control device 12 is supplied with power from the battery pack 14 during use of the motion control device.

In some examples, the drain on a battery of a battery-powered mobile computing device 22, when used with a motion control device 12, can be reduced in the following manner. A motion control assembly 10, comprising a motion control device 12 and a battery pack 14, is provided as an integral, one-piece unit. A motion control assembly 10 can also be selected in which battery pack 14 is coupled to but separable from motion control device 12. The motion control device 12 is capable of being powered by the battery pack 14. A user is instructed to do the following: connect the motion control device 12 to an electrical connector 30 of a battery-powered mobile computing device 22; and, operate the motion control device 12 with power from the battery pack 14 during use of the motion control device.

In some examples, a rechargeable battery pack 14 is selected as the battery pack. In some examples, energy can be supplied to the rechargeable battery pack 14 using at least one of a recharging cable 18, a solar panel 19, and an inductive charger 21. In some, generally preferred, examples the motion control device 12 operates using no power from the mobile computing device 22.

While discussed herein with reference to example embodiments in which the battery pack and the motion control device comprise an integral, one-piece unit, it should be appreciated that, as mentioned above, in alternative embodiments, the battery pack can be a separate unit pluggable into the motion control device.

Overview of Machine Sensory and Control Systems

In one embodiment, a motion sensing and controller system provides for detecting that some variation(s) in one or more portions of interest of a user has occurred, for determining that an interaction with one or more machines corresponds to the variation(s), for determining if the interaction should occur, and, if so, for affecting the interaction. The Machine Sensory and Control System (MSCS) typically includes a position detection system, a variation determination system, an interaction system and an application control system.

Figure 5:
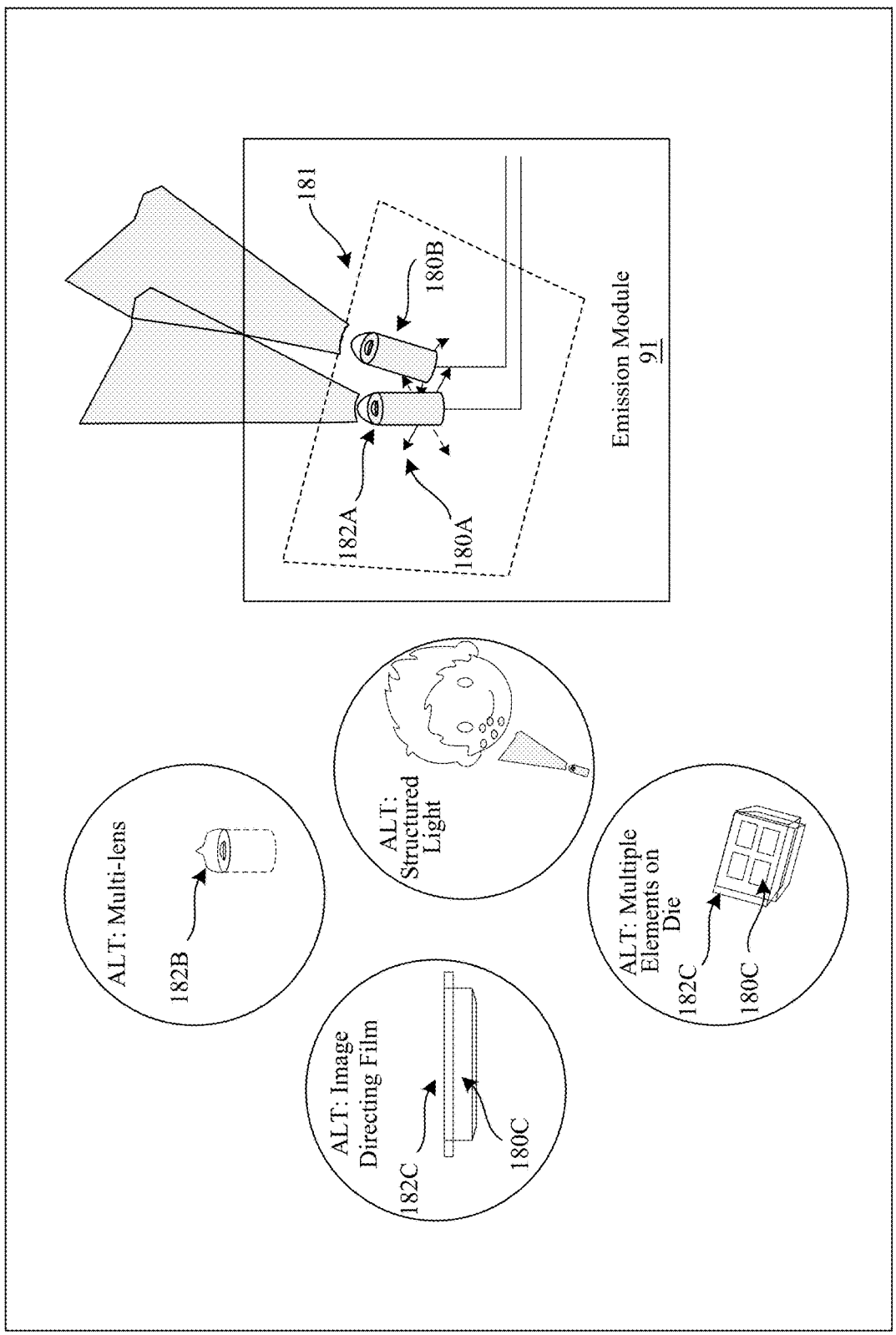
FIG. 5 illustrates an emission module showing different examples of materials or devices used with the emitters of the emission module.

As FIG. 1F shows, one detection system 90A embodiment includes an emission module 91, a detection module 92, a controller 96, a processing module 94 and a machine control module 95. In one embodiment, the emission module includes one or more emitter(s) 180A, 180B (e.g., LEDs or other devices emitting light in the IR, visible, or other spectrum regions, or combinations thereof; radio and/or other electromagnetic signal emitting devices) that are controllable via emitter parameters (e.g., frequency, activation state, firing sequences and/or patterns, etc.) by the controller 96. However, other existing/emerging emission mechanisms and/or some combination thereof can also be utilized in accordance with the requirements of a particular implementation. The emitters 180A, 180B can be individual elements coupled with materials or devices 182 (and/or materials) (e.g., lenses 182A, multi-lenses 182B (of FIG. 5), image directing film (IDF) 182C (of FIG. 5), liquid lenses, combinations thereof, and/or others) with varying or variable optical properties to direct the emission, one or more arrays 180C of emissive elements (combined on a die or otherwise), with or without the addition of devices 182C for directing the emission, or combinations thereof, and positioned within an emission region 181 (of FIG. 5) according to one or more emitter parameters (i.e., either statically (e.g., fixed, parallel, orthogonal or forming other angles with a work surface, one another or a display or other presentation mechanism) or dynamically (e.g., pivot, rotate and/or translate) mounted, embedded (e.g., within a machine or machinery under control) or otherwise coupleable using an interface (e.g., wired or wireless)). In some embodiments, structured lighting techniques can provide improved surface feature capture capability by casting illumination according to a reference pattern onto the object 98. Image capture techniques described in further detail herein can be applied to capture and analyze differences in the reference pattern and the pattern as reflected by the object 98. In yet further embodiments, detection system 90A may omit emission module 91 altogether (e.g., in favor of ambient lighting).

Figure 6:
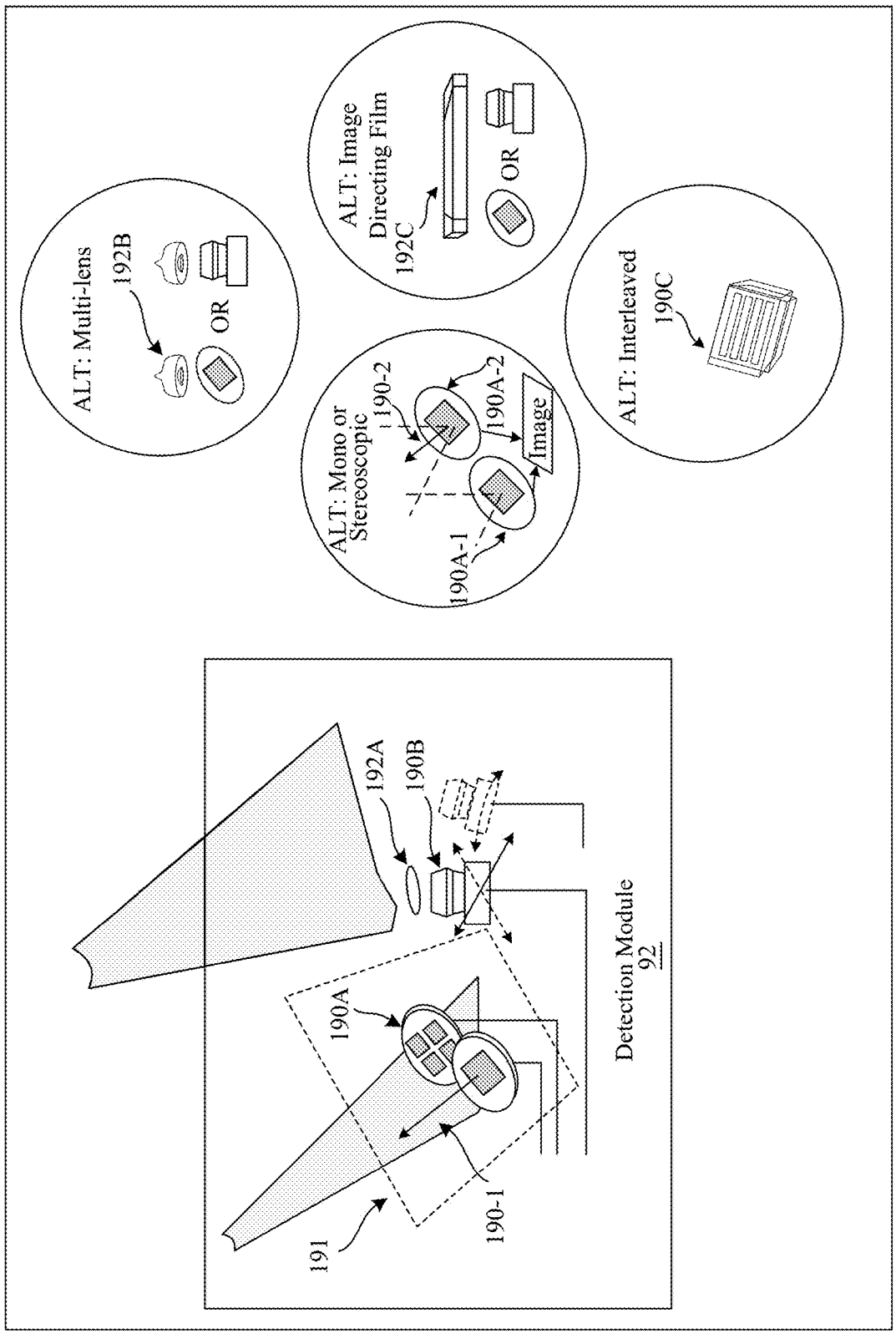
FIG. 6 shows a detection module including capture devices coupled with different types of devices and/or material, such as lenses and image directing film, for capturing images of and information about an object.

In one embodiment, the detection module 92 includes one or more capture device(s) 190A, 190B (e.g., light (or other electromagnetic radiation sensitive devices) that are controllable via the controller 96. The capture device(s) 190A, 190B can comprise individual or multiple arrays of image capture elements 190A (e.g., pixel arrays, CMOS or CCD photo sensor arrays, or other imaging arrays) or individual or arrays of photosensitive elements 190B (e.g., photodiodes, photo sensors, single detector arrays, multi-detector arrays, or other configurations of photo sensitive elements) or combinations thereof. Arrays of image capture device(s) 190C (of FIG. 6) can be interleaved by row (or column or a pattern or otherwise addressable singly or in groups). However, other existing/emerging detection mechanisms and/or some combination thereof can also be utilized in accordance with the requirements of a particular implementation. Capture device(s) 190A, 190B each can include a particular vantage point 190-1 from which objects 98 within area of interest 5 are sensed and can be positioned within a detection region 191 (of FIG. 6) according to one or more detector parameters (i.e., either statically (e.g., fixed, parallel, orthogonal or forming other angles with a work surface, one another or a display or other presentation mechanism) or dynamically (e.g. pivot, rotate and/or translate), mounted, embedded (e.g., within a machine or machinery under control) or otherwise coupleable using an interface (e.g., wired or wireless)). Capture devices 190A, 190B can be coupled with devices 192 (and/or materials) (of FIG. 6) (e.g., lenses 192A (of FIG. 6), multi-lenses 192B (of FIG. 6), image directing film (IDF) 192C (of FIG. 6), liquid lenses, combinations thereof, and/or others) with varying or variable optical properties for directing the reflectance to the capture device for controlling or adjusting resolution, sensitivity and/or contrast. Capture devices 190A, 190B can be designed or adapted to operate in the IR, visible, or other spectrum regions, or combinations thereof; or alternatively operable in conjunction with radio and/or other electromagnetic signal emitting devices in various applications. In an embodiment, capture devices 190A, 190B can capture one or more images for sensing objects 98 and capturing information about the object (e.g., position, motion, etc.). In embodiments comprising more than one capture device, particular vantage points of capture devices 190A, 190B can be directed to area of interest 5 so that fields of view 190-2 of the capture devices at least partially overlap. Overlap in the fields of view 190-2 provides capability to employ stereoscopic vision techniques (see, e.g., FIG. 6), including those known in the art to obtain information from a plurality of images captured substantially contemporaneously.

While illustrated with reference to a particular embodiment in which control of emission module 91 and detection module 92 are co-located within a common controller 96, it should be understood that these functions will be separate in some embodiments, and/or incorporated into one or a plurality of elements comprising emission module 91 and/or detection module 92 in some embodiments. Controller 96 comprises control logic (hardware, software or combinations thereof) to conduct selective activation/de-activation of emitter(s) 180A, 180B (and/or control of active directing devices) in on-off, or other activation states or combinations thereof to produce emissions of varying intensities in accordance with a scan pattern which can be directed to scan an area of interest 5. Controller 96 can comprise control logic (hardware, software or combinations thereof) to conduct selection, activation and control of capture device(s) 190A, 190B (and/or control of active directing devices) to capture images or otherwise sense differences in reflectance or other illumination. Signal processing module 94 determines whether captured images and/or sensed differences in reflectance and/or other sensor—perceptible phenomena indicate a possible presence of one or more objects of interest 98, including control objects 99, the presence and/or variations thereof can be used to control machines and/or other applications 95.

In various embodiments, the variation of one or more portions of interest of a user can correspond to a variation of one or more attributes (position, motion, appearance, surface patterns) of a user hand 99, finger(s), points of interest on the hand 99, facial portion 98 other control objects (e.g., styli, tools) and so on (or some combination thereof) that is detectable by, or directed at, but otherwise occurs independently of the operation of the machine sensory and control system. Thus, for example, the system is configurable to 'observe' ordinary user locomotion (e.g., motion, translation, expression, flexing, deformation, and so on), locomotion directed at controlling one or more machines (e.g., gesturing, intentionally system-directed facial contortion, etc.), attributes thereof (e.g., rigidity, deformation, fingerprints, veins, pulse rates and/or other biometric parameters). In one embodiment, the system provides for detecting that some variation(s) in one or more portions of interest (e.g., fingers, fingertips, or other control surface portions) of a user has occurred, for determining that an interaction with one or more machines corresponds to the variation(s), for determining if the interaction should occur, and, if so, for at least one of initiating, conducting, continuing, discontinuing and/ or modifying the interaction and/or a corresponding interaction.

Figure 7:
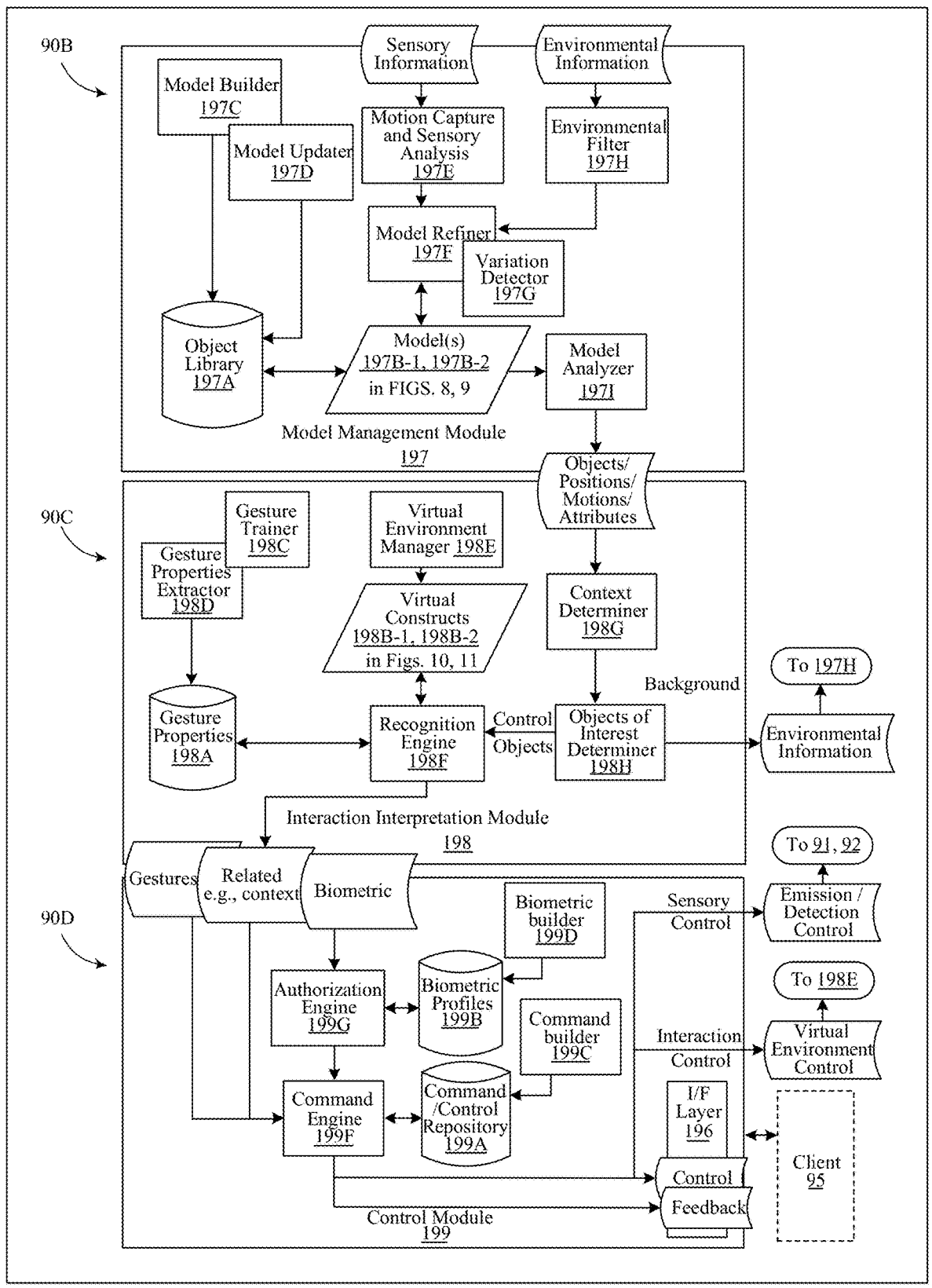
FIG. 7 is a flow diagram of a variation determination system, an interaction system and an application control system.

For example and with reference to FIG. 7, a variation determination system 90B embodiment comprises a model management module 197 that provides functionality to build, modify, customize one or more models to recognize variations in objects, positions, motions and attribute state and/or change in attribute state (of one or more attributes) from sensory information obtained from detection system 90A. A motion capture and sensory analyzer 197E finds motions (i.e., translational, rotational), conformations, and presence of objects within sensory information provided by detection system 90A. The findings of motion capture and sensory analyzer 197E serve as input of sensed (e.g., observed) information from the environment with which model refiner 197F can update predictive information (e.g., models, model portions, model attributes, etc.).

A model management module 197 embodiment comprises a model refiner 197F to update one or more models 197B (or portions thereof) from sensory information (e.g., images, scans, other sensory-perceptible phenomenon) and environmental information (i.e., context, noise, etc.); enabling a model analyzer 197I to recognize object, position, motion and attribute information that might be useful in controlling a machine. Model refiner 197F employs an object library 197A to manage objects including one or more models 197B (i.e., of user portions (e.g., hand, face), other control objects (e.g., styli, tools)) or the like (see e.g., model 197B-1, 197B-2 of FIGS. 8, 9)), model components (i.e., shapes, 2D model portions that sum to 3D, outlines 194 and/or outline portions 194A, 194B (i.e., closed curves), attributes 197-5 (e.g., attach points, neighbors, sizes (e.g., length, width, depth), rigidity/flexibility, torsional rotation, degrees of freedom of motion and others) and so forth) (see e.g., 197B-1 197B-2 of FIGS. 8-9), useful to define and update models 197B, and model attributes 197-5. While illustrated with reference to a particular embodiment in which models, model components and attributes are co-located within a common object library 197A, it should be understood that these objects will be maintained separately in some embodiments.

Figure 8:
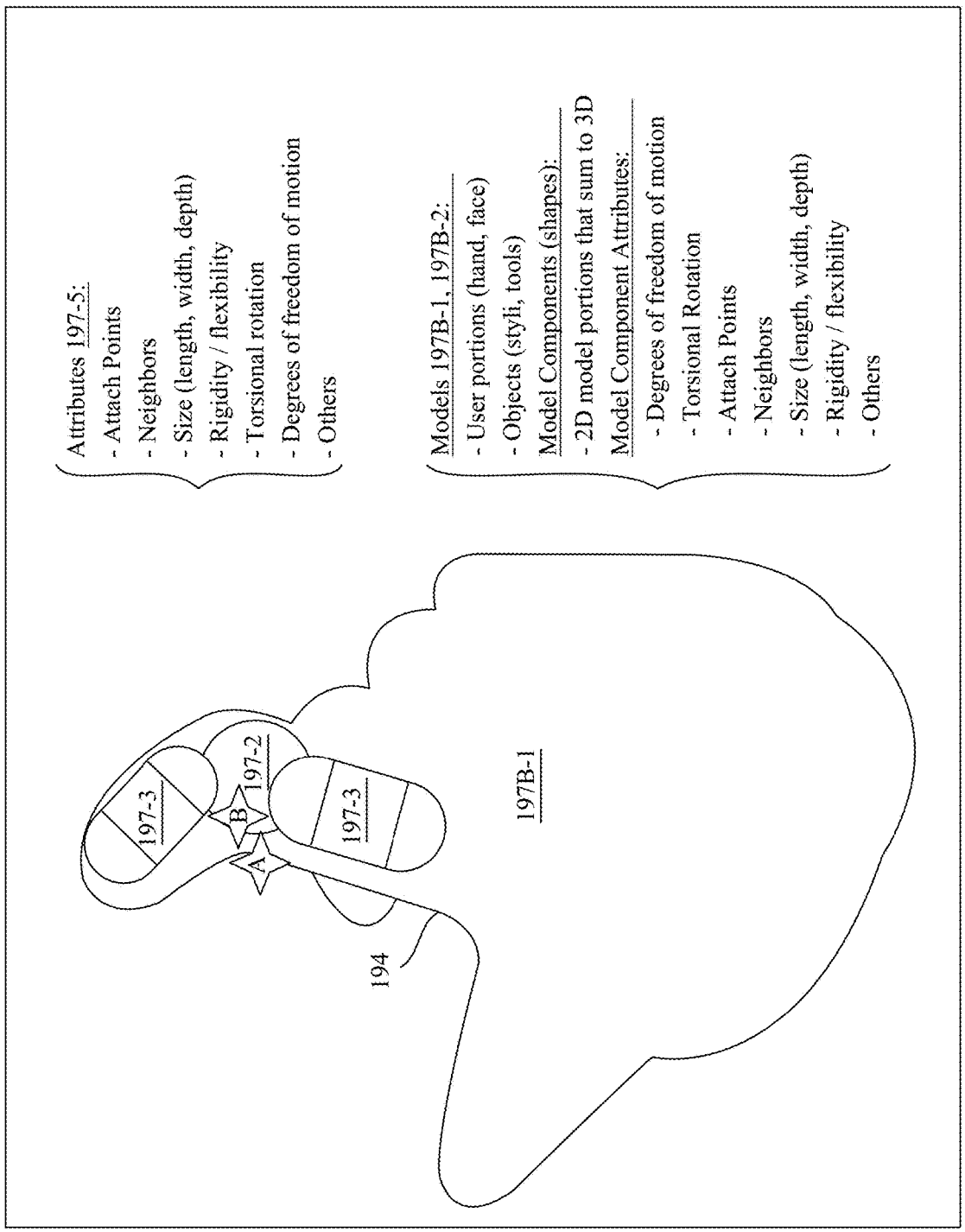
FIG. 8 illustrates prediction information including a model of the control object.

FIG. 8 illustrates prediction information including a model 197B-1 of a control object (e.g., FIG. 4: 99) constructed from one or more model subcomponents 197-2, 197-3 selected and/or configured to represent at least a portion of a surface of control object 99, a virtual surface portion 194 and one or more attributes 197-5. Other components can be included in prediction information 197B-1 not shown in FIG. 8 for clarity sake. In an embodiment, the model subcomponents 197-2, 197-3 can be selected from a set of radial solids, which can reflect at least a portion of a control object 99 in terms of one or more of structure, motion characteristics, conformational characteristics, other types of characteristics of control object 99, and/or combinations thereof. In one embodiment, radial solids include a contour and a surface defined by a set of points having a fixed distance from the closest corresponding point on the contour. Another radial solid embodiment includes a set of points normal to points on a contour and a fixed distance therefrom. In an embodiment, computational technique(s) for defining the radial solid include finding a closest point on the contour and the arbitrary point, then projecting outward the length of the radius of the solid. In an embodiment, such projection can be a vector normal to the contour at the closest point. An example radial solid (e.g., 197-3) includes a "capsuloid", i.e., a capsule shaped solid including a cylindrical body and semi-spherical ends. Another type of radial solid (e.g., 197-2) includes a sphere. Other types of radial solids can be identified based on the foregoing teachings.

Figure 4:
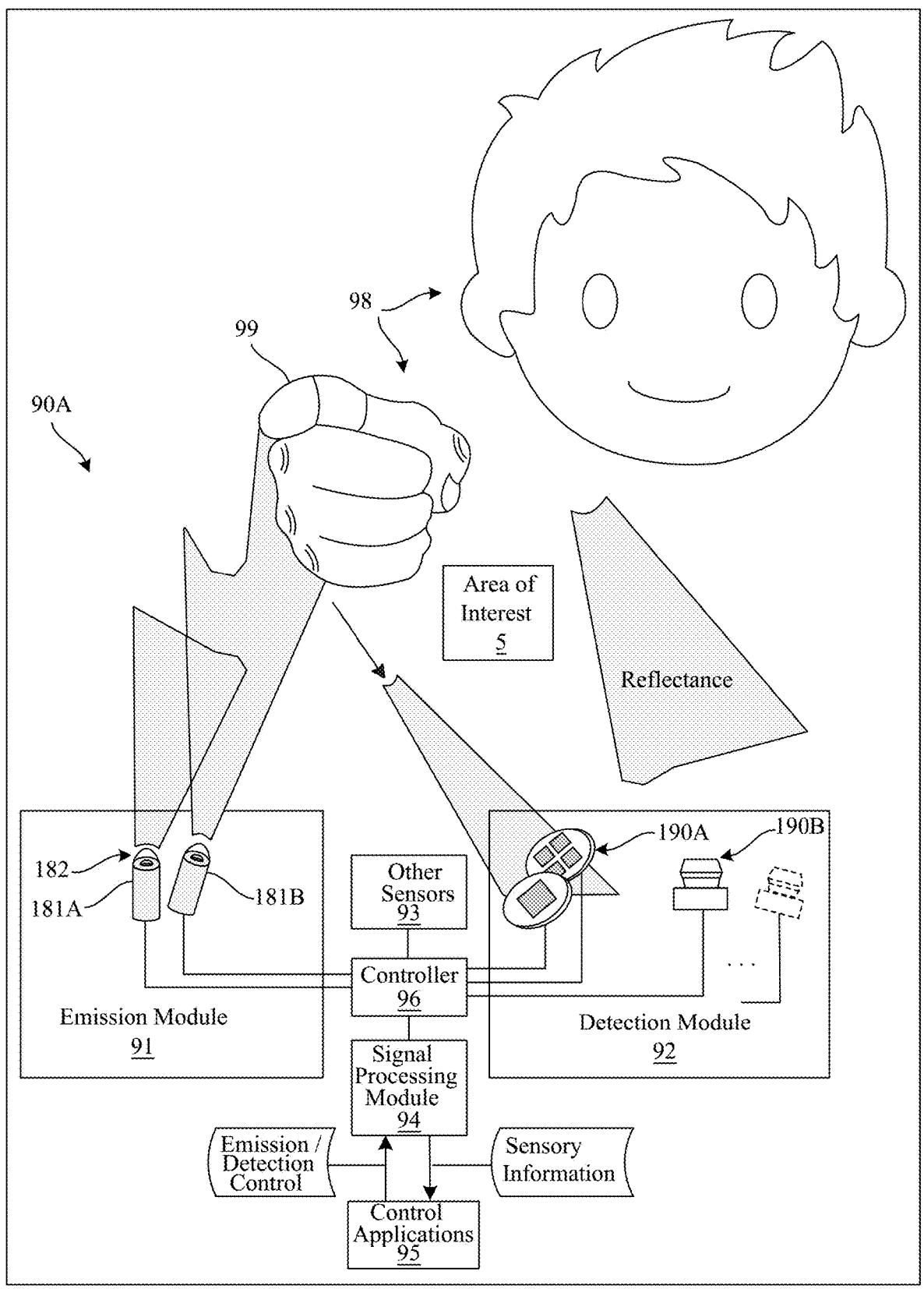
FIG. 4 shows an embodiment of a detection system including various components of the detection system along with objects within an area of interest.
Figure 9:
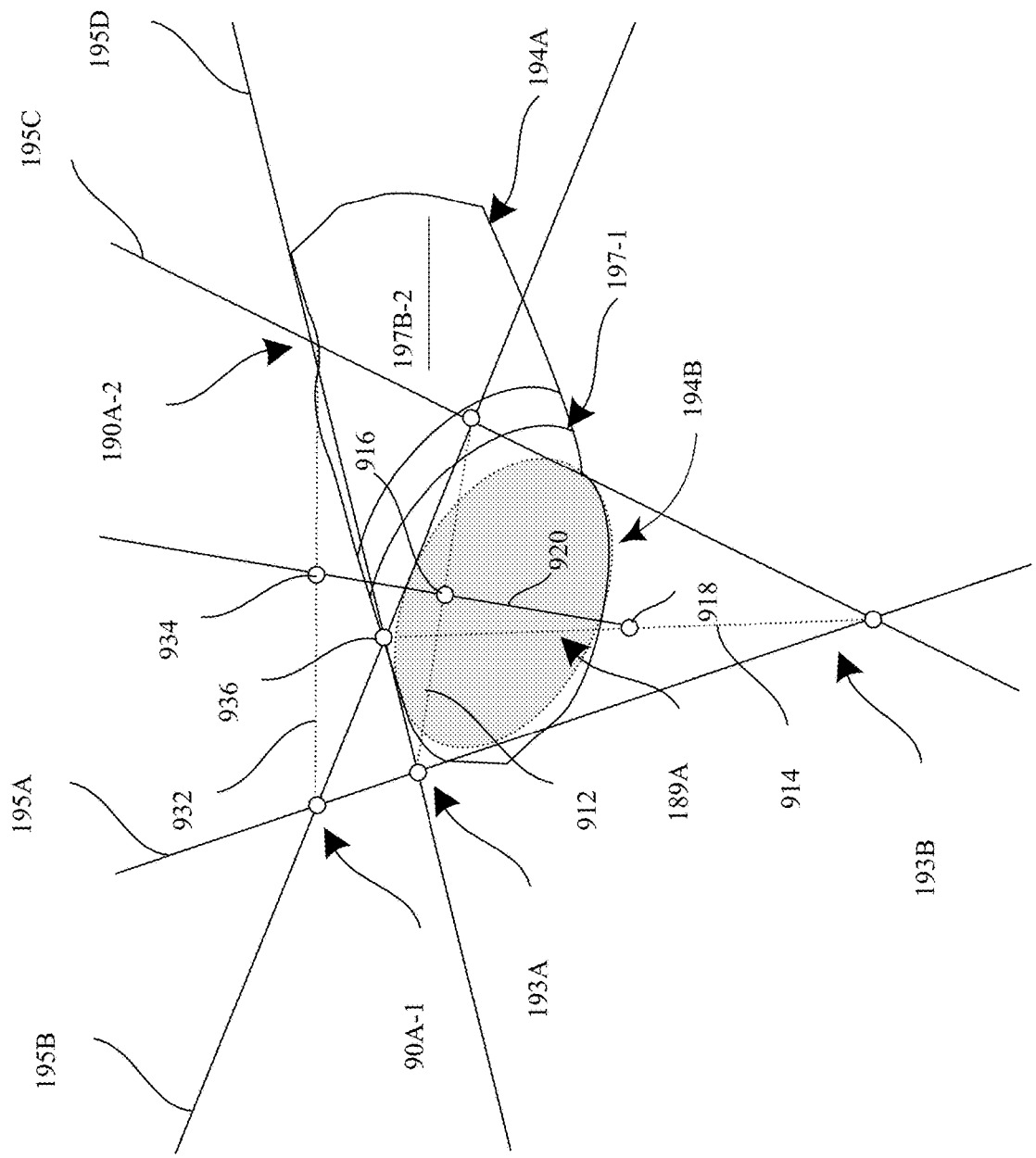
FIG. 9 shows sets of points in space created by the intersection of lines surrounding a cross-section of the object.

In an embodiment and with reference to FIGS. 4, 9, updating predictive information to observed information comprises selecting one or more sets of points (e.g., FIG. 9: 193A, 193B) in space surrounding or bounding the control object within a field of view of one or more image capture device(s). As shown by FIG. 9, points 193 can be determined using one or more sets of lines 195A, 195B, 195C, and 195D originating at vantage point(s) (e.g., FIG. 4: 190-1, 190-2) associated with the image capture device(s) (e.g., FIG. 4: 190A-1, 190A-2) and determining therefrom one or more intersection point(s) defining a bounding region (i.e., region formed by lines FIG. 9: 195A, 195B, 195C, and 195D) surrounding a cross-section of the control object. The bounding region can be used to define a virtual surface (FIG. 9: 194) to which model subcomponents 197-1, 197-2, 197-3, and 197-4 can be compared. The virtual surface 194 can include a visible portion 194A and a non-visible "inferred" portion 194B. Virtual surfaces 194 can include straight portions and/or curved surface portions of one or more virtual solids (i.e., model portions) determined by model refiner 197F.

For example and according to one embodiment illustrated by FIG. 9, model refiner 197F determines to model subcomponent 197-1 of an object portion (happens to be a finger) using a virtual solid, an ellipse in this illustration, or any of a variety of 3D shapes (e.g., ellipsoid, sphere, or custom shape) and/or 2D slice(s) that are added together to form a 3D volume. Accordingly, beginning with generalized equations for an ellipse (1) with (x, y) being the coordinates of a point on the ellipse, $(x_C, y_C)$ the center, a and b the axes, and $\theta$ the rotation angle. The coefficients $C_1$, $C_2$ and $C_3$ are defined in terms of these parameters, as shown:

$$C_1 x^2 + C_2 xy + C_3 y^2 \cdot (2C_1 x_C + C_2 y_C)x - \qquad (1)$$
$$(2C_3 y_C + C_2 x_C)y + (C_1 x_C^2 + C_2 x_C y_C + C_3 y_C^2 - 1) = 0$$

$$C_1 = \frac{\cos^2 \theta}{a^2} + \frac{\sin^2 \theta}{b^2}$$

$$C_2 = -2\cos\theta\sin\theta\left(\frac{1}{a^2} - \frac{1}{b^2}\right)$$

$$C_3 = \frac{\sin^2 \theta}{a^2} + \frac{\cos^2 \theta}{b^2}$$

The ellipse equation (1) is solved for $\theta$, subject to the constraints that: (1) $(x_C, y_C)$ must lie on the centerline determined from the four tangents 195A, 195B, 195C, and 195D (i.e., centerline 189A of FIG. 9); and (2) a is fixed at the assumed value $a_0$. The ellipse equation can either be solved for $\theta$ analytically or solved using an iterative numerical solver (e.g., a Newtonian solver as is known in the art). An analytic solution can be obtained by writing an equation for the distances to the four tangent lines given a $y_C$ position, then solving for the value of $y_C$ that corresponds to the desired radius parameter $a=a_0$. Accordingly, equations (2) for four tangent lines in the x-y plane (of the slice), in which coefficients $A_i$, $B_i$ and $D_i$ (for i=1 to 4) are determined from the tangent lines 195A, 195B, 195C, and 195D identified in an image slice as described above.

$$A_1 x + B_1 y + D_1 = 0$$

$$A_2 x + B_2 y + D_2 = 0$$

$$A_3 x + B_3 y + D_3 = 0$$

$$A_4 x + B_4 y + D_4 = 0 \qquad (2)$$

Four column vectors $r_{12}$, $r_{23}$, $r_{14}$ and $r_{24}$ are obtained from the coefficients $A_i$, $B_i$ and $D_i$ of equations (2) according to equations (3), in which the "\" operator denotes matrix left division, which is defined for a square matrix M and a column vector v such that $M\backslash v = r$, where r is the column vector that satisfies $Mr = v$:

$$r_{13} = \begin{bmatrix} A_1 & B_1 \\ A_3 & B_3 \end{bmatrix} \backslash \begin{bmatrix} -D_1 \\ -D_3 \end{bmatrix} \qquad (3)$$

$$r_{23} = \begin{bmatrix} A_2 & B_2 \\ A_3 & B_3 \end{bmatrix} \backslash \begin{bmatrix} -D_{21} \\ -D_3 \end{bmatrix}$$

$$r_{14} = \begin{bmatrix} A_1 & B_1 \\ A_4 & B_4 \end{bmatrix} \backslash \begin{bmatrix} -D_1 \\ -D_4 \end{bmatrix}$$

-continued $$r_{24} = \begin{bmatrix} A_2 & B_2 \\ A_4 & B_4 \end{bmatrix} \backslash \begin{bmatrix} -D_2 \\ -D_4 \end{bmatrix}$$

Four component vectors G and H are defined in equations (4) from the vectors of tangent coefficients A, B and D and scalar quantities p and q, which are defined using the column vectors $r_{12}$, $r_{23}$, $r_{14}$ and $r_{24}$ from equations (3).

$c1 = (r_{13} + r_{24})/2$ $c2 = (r_{14} + r_{23})/2$ $\delta 1 = c2_1 - c1_1$ $\delta 2 = c2_2 - c1_2$ $p = \delta 1/\delta 2$ $q = c1_1 - c1_2 * p$ $G = Ap + B$ $H = Aq + D$ (4)

Six scalar quantities $v_{A2}$, $v_{AB}$, $v_{B2}$, $w_{A2}$, $w_{AB}$, and $w_{B2}$ are defined by equation (5) in terms of the components of vectors G and H of equation (4).

$$v = \begin{bmatrix} G_2^2 & G_3^2 & G_4^2 \\ (G_2 H_2)^2 & (G_3 H_3)^2 & (G_4 H_4)^2 \\ H_2^2 & H_3^2 & H_4^2 \end{bmatrix} \backslash \begin{bmatrix} 0 \\ 0 \\ 1 \end{bmatrix}$$ (5)

$$w = \begin{bmatrix} G_2^2 & G_3^2 & G_4^2 \\ (G_2 H_2)^2 & (G_3 H_3)^2 & (G_4 H_4)^2 \\ H_2^2 & H_3^2 & H_4^2 \end{bmatrix} \backslash \begin{bmatrix} 0 \\ 1 \\ 0 \end{bmatrix}$$

$v_{A2} = (v_1 A_1)^2 + (v_2 A_2)^2 + (v_3 A_3)^2$ $v_{AB} = (v_1 A_1 B_1)^2 + (v_2 A_2 B_2)^2 + (v_3 A_3 B_3)^2$ $v_{B2} = (v_1 B_1)^2 + (v_2 B_2)^2 + (v_3 B_3)^2$ $w_{A2} = (w_1 A_1)^2 + (w_2 A_2)^2 + (w_3 A_3)^2$ $w_{AB} = (w_1 A_1 B_1)^2 + (w_2 A_2 B_2)^2 + (w_3 A_3 B_3)^2$ $w_{B2} = (w_1 B_1)^2 + (w_2 B_2)^2 + (w_3 B_3)^2$

Using the parameters defined in equations (1)-(5), solving for $\theta$ is accomplished by solving the eighth-degree polynomial equation (6) for t, where the coefficients $Q_i$ (for i=0 to 8) are defined as shown in equations (7)-(15).

$0 = Q_8 t^8 + Q_7 t^7 + Q_6 t^6 + Q_5 t^5 + Q_4 t^4 + Q_3 t^3 + Q_2 t^2 + Q_1 t + Q_0$ (6)

The parameters $A_1$, $B_1$, $G_1$, $H_1$, $v_{A2}$, $v_{AB}$, $v_{B2}$, $w_{A2}$, $w_{AB}$, and $w_{B2}$ used in equations (7)-(15) are defined as shown in equations (1)-(4). The parameter n is the assumed semi-major axis (in other words, $a_0$). Once the real roots t are known, the possible values of $\theta$ are defined as $\theta = a\tan(t)$.

$Q_8 = 4A_1^2 n^2 v_{B2}^2 + 4v_{B2} B_1^2 (1 - n^2 v_{A2}) - (G_1(1 - n^2 v_{A2}) w_{B2} + n^2 v_{B2} w_{A2} + 2H_1 v_{B2})^2$ (7)

$Q_7 = -(2(2n^2 v_{AB} w_{A2} + 4H_1 v_{AB} + 2G_1 n^2 v_{AB} w_{B2} + 2G_1(1 - n^2 v_{A2}) w_{AB}))(G_1(1 - n^2 v_{A2}) w_{B2} + n^2 v_{B2} w_{A2} + 2H_1 v_{B2}) - 8A_1 B_1 n^2 v_{B2}^2 + 16A_1^2 n^2 v_{AB} v_{B2} + (4(2A_1 B_1(1 - n^2 v_{A2}) + 2B_1^2 n^2 v_{AB})) v_{B2} + 8B_1^2 (1 - n^2 v_{A2}) v_{AB}$ (8)

$Q_6 = -(2(2H_1 v_{B2} + 2H_1 v_{A2} + n^2 v_{A2} w_{A2} + n^2 v_{B2}(-2w_{AB} + w_{B2}) + G_1(n^2 v_{B2} + 1) w_{B2} + 4G_1 n^2 v_{AB} w_{AB} + G_1(1 - n^2 v_{A2}) v_{A2})) \times (G_1(1 - n^2 v_{A2}) w_{B2} + n^2 v_{B2} w_{A2} + 2H_1 v_{B2}) - (2n^2 v_{AB} w_{A2} + 4H_1 v_{AB} + 2G_1 n^2 v_{AB} w_{B2} + 2G_1(1 - n^2 v_{A2}) w_{AB})^2 + 4B_1^2 n^2 v_{B2}^2 - 32A_1 B_1 n^2 v_{AB} v_{B2} + 4A_1^2 n^2 (2v_{A2} v_{B2} + 4v_{AB}^2) + 4A_1^2 n^2 v_{B2}^2 + (4(4A_1^2(1 - n^2 v_{A2}) + 4A_1 B_1 n^2 v_{AB} + B_1^2(-n^2 v_{B2} + 1) + B_1^2(1 - n^2 v_{A2}))) v_{B2} + (8(2A_1 B_1(1 - n^2 v_{A2}) + 2B_1^2 n^2 v_{AB})) v_{AB} + 4B_1^2 (1 - n^2 v_{A2}) v_{A2}$ (9)

$Q_5 = -(2(4H_1 v_{AB} + 2G_1(-n^2 v_{B2} + 1) w_{AB} + 2G_1 n^2 v_{AB} v_{A2} + 2n^2 v_A(-2w_{AB} + w_{B2})))(G_1(1 - n^2 v_{A2}) w_{B2} + n^2 v_{B2} w_{A2} + 2H_1 v_{B2}) - (2(2H_1 v_{B2} + 2H_1 v_{A2} + n^2 v_{A2} w_{A2} + n^2 v_{B2}(-2w_{AB} + w_{B2}) + G_1(-n^2 v_{B2} + 1) w_{B2} + 4G_1 n^2 v_{AB} w_{AB} + G_1(1 - n^2 v_{A2}) v_{A2})) \times (2n^2 v_{AB} w_{A2} + 4H_1 v_{AB} + 2G_1 n^2 v_{AB} w_{B2} + 2G_1(1 - n^2 v_{A2}) w_{AB}) + 16B^2 n^2 v_{AB} v_{B2} - 8A_1 B_1 n^2 (2v_{A2} v_{B2} + 4v_{AB}^2) + 16A_1^2 n^2 v_{A2} v_{AB} - 8A_1 B_1 n^2 v^2_{B2} + 16A_1^2 n^2 v_{AB} v_{B2} + (4(2A_1^2 n^2 v_{AB} + 2A_1 B_1(-n^2 v_{B2} + 1) + 2A_1 B_1(1 - n^2 v_{A2}) + 2B_1^2 n^2 v_{AB})) v_{B2} + (8(A_1^2(1 - n^2 v_{A2}) + 4A_1 B_1 n^2 v_{AB} + B_1^2(-n^2 v_{B2} + 1) + B_1^2(1 - n^2 v_{A2}))) v_{AB} + (4(2A_1 B_1(1 - n^2 v_{A2}) + 2B_1^2 n^2 v_{AB})) v_{A2}$ (10)

$Q_4 = (4(A_1^2(-n^2 v_{B2}) + A_1^2(1 - n^2 v_{A2}) + 4A_1 B_1 n^2 v_{AB} + B_1^2(-n^2 v_{B2} + 1))) v_{B2} + (8(2A_1^2 n^2 v_{AB} + 2A_1 B_1(-n^2 v_{B2} + 1) + 2A_1 B_1(1 - n^2 v_{A2}) + 2B_1^2 n^2 v_{AB})) v_{AB} + (4(A_1^2(1 - n^2 v_{A2}) + 4A_1 B_1 n^2 v_{AB} + B_1^2(-n^2 v_{B2} + 1) + B_1^2(1 - n^2 v_{A2}))) v_{A2} + 4B_1^2 n^2(2v_{A2} v_{B2} + 4v_{AB}^2) - 32A_1 B_1 n^2 v_{AB} v_{AB} + 4A_1^2 n^2 v_{A2}^2 + 4B_1^2 n^2 v_{B2}^2 - 32A_1 B_1 n^2 v_{AB} v_{B2} + 4A_1^2 n^2(2v_{A2} v_{B2} + 4v_{AB}^2) - (2(G_1(-n^2 v_{B2} + 1) v_{A2} + n^2 v_{A2}(-2w_{AB} + w_{B2}) + 2H_1 v_{A2}))(G_1(1 - n^2 v_{A2}) w_{B2} + n^2 v_{B2} w_{A2} + 2H_1 v_{B2}) - (2(4H_1 v_{AB} + 2G_1(-n^2 v_{B2} + 1) w_{AB} + 2G_1 n^2 v_{AB} v_{A2} + 2n^2 v_{AB}(-2w_{AB} + w_{B2}))) \times (2n^2 v_{AB} w_{A2} + 4H_1 v_{AB} + 2G_1 n^2 v_{AB} w_{B2} + 2G_1(1 - n^2 v_{A2}) w_{AB}) - (2H_1 v_{B2} + 2H_1 v_{A2} + n^2 v_{A2} w_{A2} + n^2 v_{B2}(-2w_{AB} + w_{B2}) + G_1(-n^2 v_{B2} + 1) w_{B2} + 4G_1 n^2 v_{AB} w_{AB} + G_1(1 - n^2 v_{A2}) v_{A2})^2$ (11)

$Q_3 = -(2(G_1(-n^2 v_{B2} + 1) v_{A2} + n^2 v_{A2}(-2w_{AB} + w_{B2}) + 2H_1 v_{A2}))(2n^2 v_{AB} w_{A2} + 4H_1 v_{AB} + 2G_1 n^2 v_{AB} w_{B2} + 2G_1(1 - n^2 v_{A2}) w_{AB}) - (2(4H_1 v_{AB} + 2G_1(-n^2 v_{B2} + 1) w_{AB} + 2G_1 n^2 v_{AB} v_{A2} + 2n^2 v_{AB}(-2w_{AB} + w_{B2}))) \times (2H_1 v_{B2} + 2H_1 v_{A2} + n^2 v_{A2} w_{A2} + n^2 v_{B2}(-2w_{AB} + w_{B2}) + G_1(-n^2 v_{B2} + 1) w_{B2} + 4G_1 n^2 v_{AB} w_{AB} + G_1(1 - n^2 v_{A2}) v_{A2}) + 16B_1^2 n^2 v_{A2} v_{AB} - 8A_1 B_1 n^2 v_{A2}^2 + 16B_1^2 n^2 v_{AB} v_{B2} - 8A_1 B_1 n^2(2v_{A2} v_{B2} + 4v_{AB}^2) + 16A_1^2 n^2 v_{A2} v_{AB} + (4(2A_1^2 n^2 v_{AB} + 2A_1 B_1(-n^2 v_{B2} + 1)))) v_{B2} + (8(A_1^2(-n^2 v_{B2} + 1) + A_1^2(1 - n^2 v_{A2}) + 4A_1 B_1 n^2 v_{AB} + B_1^2(-^2 n^2 v_{B2} + 1))) v_{AB} + (4(2A_1^2 n^2 v_{AB} + 2A_1 B_1(-n^2 v_{B2} + 1) + 2A_1 B_1(1 - n^2 v_{A2}) + 2B_1^2 n^2 v_{AB})) v_{A2}$ (12)

$Q_2 = 4A_1^2(-n^2 v_{B2} + 1) v_{B2} + (8(2A_1^2 n^2 v_{AB} + 2A_1 B_1(-n^2 v_{B2} + 1))) v_{AB} + (4(A_1^2(-n^2 v_{B2} + 1) + A_1^2(1 - n^2 v_{A2}) + 4A_1 B_1 n^2 v_{AB} + B_1^2(-n^2 v_{B2} + 1))) v_{A2} + 4B_1^2 n^2 v_{A2}^2 + 4B_1^2 n^2(2v_{A2} v_{B2} + 4v_{AB}^2) - 32A_1 B_1 n^2 v_{A2} v_{AB} + 4A_1^2 n^2 v_{A2}^2 - (2(G_1(-n^2 v_{B2} + 1) v_{A2} + n^2 v_{A2}(-2w_{AB} + w_{B2}) + 2H_1 v_{A2})) \times (2H_1 v_{B2} + 2H_1 v_{A2} + n^2 v_{A2} w_{A2} + n^2 v_{B2}(-2w_{AB} + w_{B2}) + G_1(-n^2 v_{B2} + 1) w_{B2} + 4G_1 n^2 v_{AB} w_{AB} + G_1(1 - n^2 v_{A2}) v_{A2}) - (4H_1 v_{AB} + 2G_1(-n^2 v_{B2} + 1) w_{AB} + 2G_1 n^2 v_{AB} v_{A2} + 2n^2 v_{AB}(-2w_{AB} + w_{B2}))^2$ (13)

$Q_1 = 8A_1^2(-n^2 v_{B2} + 1) v_{AB} + (4(2A_1^2 n^2 v_{AB} + 2A_1 B_1(-n^2 v_{B2} + 1))) v_{A2} + 16B_1^2 n^2 v_{A2} v_{AB} - 8A_1 B_1 n^2 v^2_{A2} - (2(G_1(-n^2 v_{B2} + 1) v_{A2} + n^2 v_{A2}(-2w_{AB} + w_{B2}) + 2H_1 v_{A2}))(4H_1 v_{AB} + 2G_1(-n^2 v_{B2} + 1) w_{AB} + 2G_1 n^2 v_{AB} v_{A2} + 2n^2 v_{AB}(-2w_{AB} + w_{B2}))$ (14)

$Q_0 = 4A_1^2(-n^2 v_{B2} + 1) v_{A2} - (G_1(-n^2 v_{B2} + 1) v_{A2} + n^2 v_{A2}(-2w_{AB} + w_{B2}) + 2H_1 v_{A2})^2 + 4B_1^2 n^2 v^2_{A2}$ (15)

In this exemplary embodiment, equations (6)-(15) have at most three real roots; thus, for any four tangent lines, there are at most three possible ellipses that are tangent to all four lines and that satisfy the $a = a_0$ constraint. (In some instances, there may be fewer than three real roots.) For each real root $\theta$, the corresponding values of $(x_C, y_C)$ and b can be readily determined. Depending on the particular inputs, zero or more solutions will be obtained; for example, in some instances, three solutions can be obtained for a typical configuration of tangents. Each solution is completely characterized by the parameters $\{\theta, a=a_0, b, (x_C, y_C)\}$. Alternatively, or additionally, a model builder 197C and model updater 197D provide functionality to define, build and/or customize model(s) 197B using one or more components in object library 197A. Once built, model refiner 197F updates and refines the model, bringing the predictive information of the model in line with observed information from the detection system 90A.

The model subcomponents 197-1, 197-2, 197-3, and 197-4 can be scaled, sized, selected, rotated, translated, moved, or otherwise re-ordered to enable portions of the model corresponding to the virtual surface(s) to conform within the points 193 in space. Model refiner 197F employs a variation detector 197G to substantially continuously determine differences between sensed information and predictive information and provide to model refiner 197F a variance useful to adjust the model 197B accordingly. Variation detector 197G and model refiner 197F are further enabled to correlate among model portions to preserve continuity with characteristic information of a corresponding object being modeled, continuity in motion, and/or continuity in deformation, conformation and/or torsional rotations.

An environmental filter 197H reduces extraneous noise in sensed information received from the detection system 90A using environmental information to eliminate extraneous elements from the sensory information. Environmental filter 197H employs contrast enhancement, subtraction of a difference image from an image, software filtering, and background subtraction (using background information provided by objects of interest determiner 198H (see below) to enable model refiner 197F to build, refine, manage and maintain model(s) 197B of objects of interest from which control inputs can be determined. Further, environmental filter 197H can provide environmental information such as input power levels and power source types, external equipment types and configurations, and so forth to command engine 199F via model refiner 197F and objects of interest determiner 198H to enable the system to (i) adjust its operations based upon power available, external equipment available and or other environmental factors, and (ii) adapt its detection of objects to these environmental factors.

A model analyzer 197I determines that a reconstructed shape of a sensed object portion matches an object model in an object library; and interprets the reconstructed shape (and/or variations thereon) as user input. Model analyzer 197I provides output in the form of object, position, motion and attribute information to an interaction system 90C.

Figure 10:
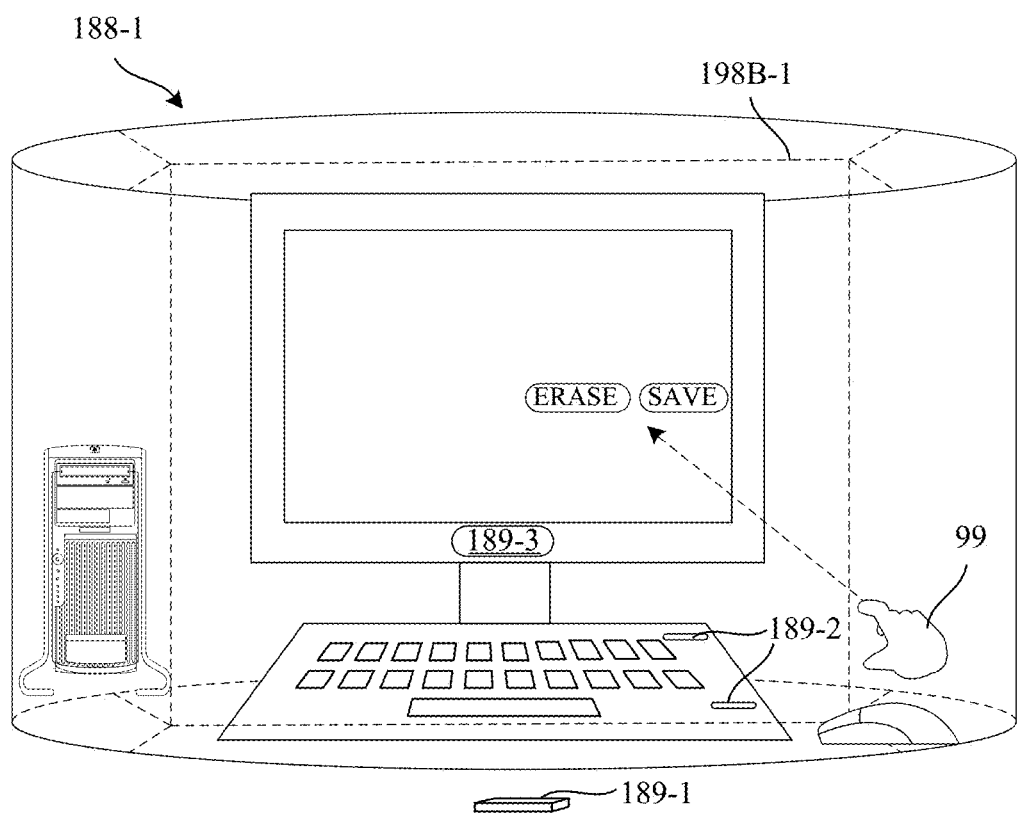
FIG. 10 illustrates a three-dimensional virtual construct relative to a keyboard and computer screen so that movement into and out of a particular region indicates control or other useful information.
Figure 11:
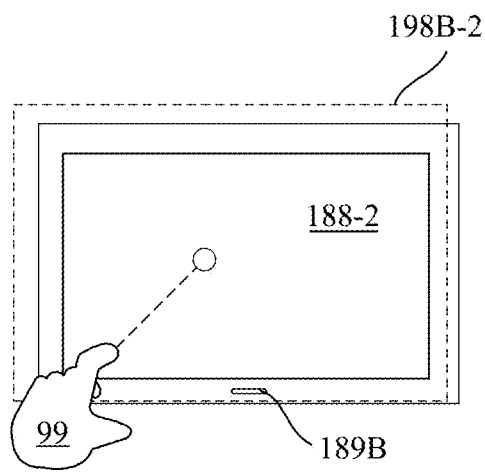
FIG. 11 illustrates a more simplified virtual construct in a region forward of a computer screen.

Again with reference to FIG. 7, an interaction system 90C includes an interaction interpretation module 198 that provides functionality to recognize command and other information from object, position, motion and attribute information obtained from variation system 90B. An interaction interpretation module 198 embodiment comprises a recognition engine 198F to recognize command information such as command inputs (i.e., gestures and/or other command inputs (e.g., speech, etc.)), related information (i.e., biometrics), environmental information (i.e., context, noise, etc.) and other information discernible from the object, position, motion and attribute information that might be useful in controlling a machine. Recognition engine 198F employs gesture properties 198A (e.g., path, velocity, acceleration, etc.), control objects determined from the object, position, motion and attribute information by an objects of interest determiner 198H and optionally one or more virtual constructs 198B (see e.g., FIGS. 10, 11: 198B-1, 198B-2) to recognize variations in control object presence or motion indicating command information, related information, environmental information and other information discernible from the object, position, motion and attribute information that might be useful in controlling a machine. With reference to FIGS. 10, 11, virtual construct 198B-1, 198B-2 implement an engagement target with which a control object 99 interacts enabling MSCS 189 to discern variations in control object (i.e., motions into, out of or relative to virtual construct 198B) as indicating control or other useful information. A gesture trainer 198C and gesture properties extractor 198D provide functionality to define, build and/or customize gesture properties 198A.

A context determiner 198G and object of interest determiner 198H provide functionality to determine from the object, position, motion and attribute information objects of interest (e.g., control objects, or other objects to be modeled and analyzed), objects not of interest (e.g., background) based upon a detected context. For example, when the context is determined to be an identification context, a human face will be determined to be an object of interest to the system and will be determined to be a control object. On the other hand, when the context is determined to be a fingertip control context, the finger tips will be determined to be object(s) of interest and will be determined to be a control objects whereas the user's face will be determined not to be an object of interest (i.e., background). Further, when the context is determined to be a styli (or other tool) held in the fingers of the user, the tool tip will be determined to be object of interest and a control object whereas the user's fingertips might be determined not to be objects of interest (i.e., background). Background objects can be included in the environmental information provided to environmental filter 197H of model management module 197. The device can detect (FIG. 7, object of interest determiner 198H) when low power condition exists (e.g., based on detected objects/background) and provide this information as related context to command engine 199F (see FIG. 7) that provides emission/detection control to emission module 91, and detection module 92 (of FIG. 4). In lower power mode(s) the emission detection modules 91, 92 simply draw lesser amounts of current than when under higher load. Low power modes are indicated e.g., when few objects being tracked, or an object being tracked that does not require high lighting levels (and hence does not require high current drain to power the high lighting levels). Further, environmental filter 197H can provide environmental information such as input power levels and power source types, external equipment types and configurations, and so forth to command engine 199F via model refiner 197F and objects of interest determiner 198H to enable the system to (i) adjust its operations based upon power available, external equipment available and or other environmental factors, and (ii) adapt its detection of objects to these environmental factors.

A virtual environment manager 198E provides creation, selection, modification and de-selection of one or more virtual constructs 198B (see FIGS. 10, 11 In some embodiments, virtual constructs (e.g., a virtual object defined in space; such that variations in real objects relative to the virtual construct, when detected, can be interpreted for control or other purposes (see FIGS. 10, 11)) are used to determine variations (i.e., virtual "contact" with the virtual construct, breaking of virtual contact, motion relative to a construct portion, etc.) to be interpreted as engagements, dis-engagements, motions relative to the construct(s), and so forth, enabling the system to interpret pinches, pokes and grabs, and so forth. Interaction interpretation module 198 provides as output the command information, related information and other information discernible from the object, position, motion and attribute information that might be useful in controlling a machine from recognition engine 198F to an application control system 90D.

Further with reference to FIG. 7, an application control system 90D includes a control module 199 that provides functionality to determine and authorize commands based upon the command and other information obtained from interaction system 90C.

A control module 199 embodiment comprises a command engine 199F to determine whether to issue command(s) and what command(s) to issue based upon the command information, related information and other information discernible from the object, position, motion and attribute information, as received from an interaction interpretation module 198. Command engine 199F employs command/control repository 199A (e.g., application commands, OS commands, commands to MSCS, misc. commands) and related information indicating context received from the interaction interpretation module 198 to determine one or more commands corresponding to the gestures, context, etc. indicated by the command information. For example, engagement gestures can be mapped to one or more controls, or a control-less screen location, of a presentation device associated with a machine under control. Controls can include imbedded controls (e.g., sliders, buttons, and other control objects in an application), or environmental level controls (e.g., windowing controls, scrolls within a window, and other controls affecting the control environment). In embodiments, controls may be displayed using 2D presentations (e.g., a cursor, cross-hairs, icon, graphical representation of the control object, or other displayable object) on display screens and/or presented in 3D forms using holography, projectors or other mechanisms for creating 3D presentations, or audible (e.g., mapped to sounds, or other mechanisms for conveying audible information) and/or touchable via haptic techniques.

Further, an authorization engine 199G employs biometric profiles 199B (e.g., users, identification information, privileges, etc.) and biometric information received from the interaction interpretation module 198 to determine whether commands and/or controls determined by the command engine 199F are authorized. A command builder 199C and biometric profile builder 199D provide functionality to define, build and/or customize command/control repository 199A and biometric profiles 199B.

Selected authorized commands are provided to machine(s) under control (i.e., "client") via interface layer 196. Commands/controls to the virtual environment (i.e., interaction control) are provided to virtual environment manager 198E. Commands/controls to the emission/detection systems (i.e., sensory control) are provided to emission module 91 and/or detection module 92 as appropriate.

In various embodiments and with reference to FIGS. 10, 11, a Machine Sensory Controller System 189 can be embodied as a standalone unit(s) 189-1 coupleable via an interface (e.g., wired or wireless)), embedded (e.g., within a machine 188-1, 188-2 or machinery under control) (e.g., FIG. 10: 189-2, 189-3, FIG. 11: 189B) or combinations thereof.

Figure 12:
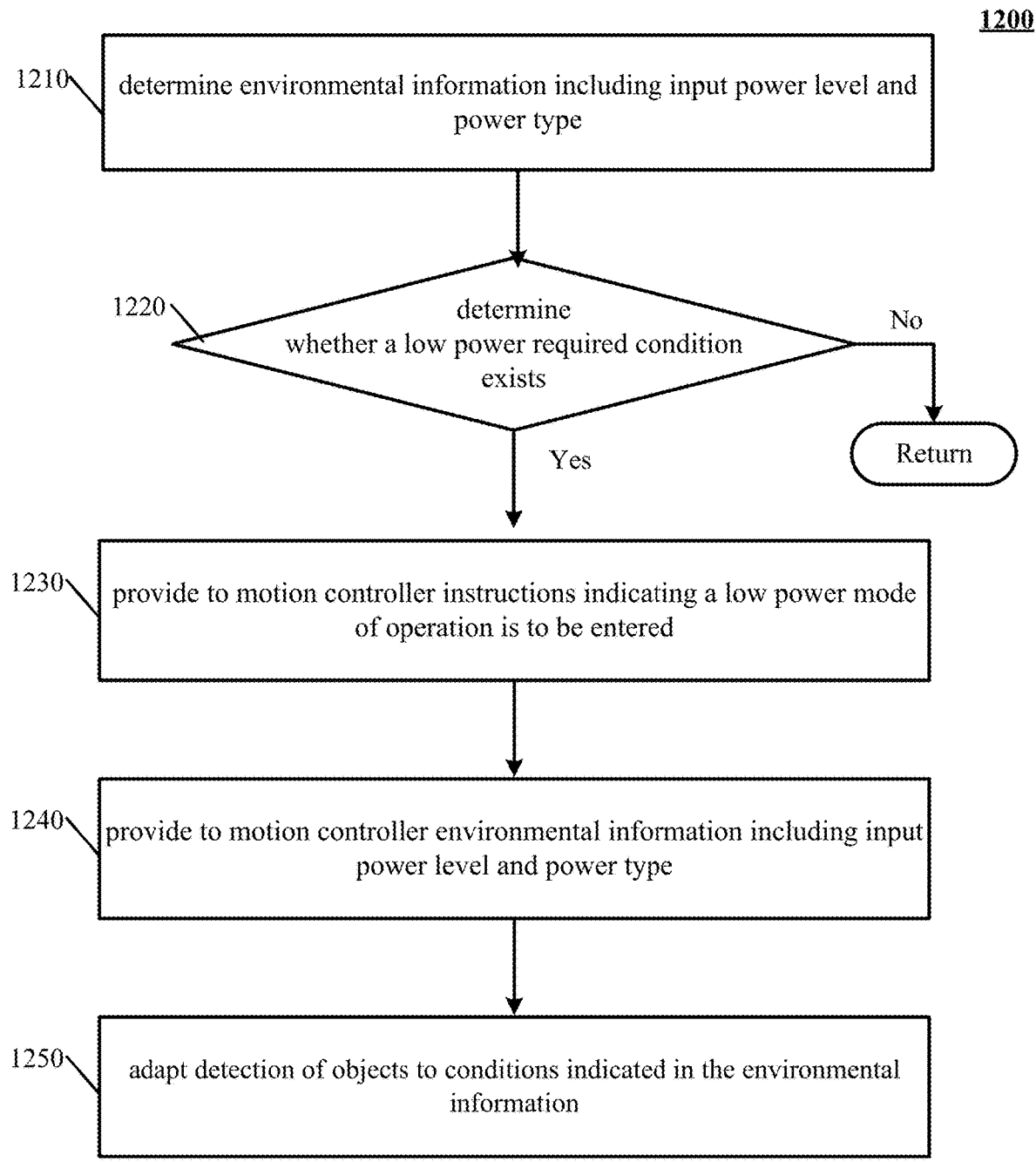
FIG. 12 illustrates a flowchart of an example drain reducing method in an embodiment.

FIG. 12 illustrates a flowchart of an example drain reducing method 1200 in an embodiment. The method can include determining environmental information, comprising an input power level, such as provided by battery pack 14, and power source type, such as one or more of a recharging cable 18, solar panel 19, or inductive charger 21 (block 1210). The method also includes determining (block 1220) whether a low power required condition exists. If so, provide (block 1230) instructions, by a command engine of the motion control assembly, to at least one of an emission module and a detection module of the motion control assembly indicating a low power mode of operation is to be entered. The environmental information, comprising an input power level and power source type, can be provided (block 1240) to the command engine. Detection of objects can be adapted (block 1250) to at least one of an input power level and a power source type. For example, in one embodiment, adapting includes driving illumination sources in the emission module with less power, or for lesser amounts of time, to reduce power consumption. In another embodiment, adapting includes the detection module performs object detection on objects sufficiently large (e.g., number of pixels in an image for example) to meet a threshold, thereby conserving power to the processor. In a yet further embodiment, adapting includes reducing frame or capture rates of camera(s) or other sensor(s) in the detection module, thereby trading accuracy for reducing power consumption. In a still yet further embodiment, the environmental filter can monitor power levels of both battery pack 14 and internal power source of the mobile computing device 22. The command engine can be instructed to "borrow" power from the internal power source of the mobile computing device 22 in instances where more power is needed and power conserving mechanisms described above have either all been implemented or cannot be implemented because ambient conditions do not permit the device to operate correctly when implemented (e.g., room too bright to reduce illumination sources, fine gestures unable to be detected with lower accuracy frame rates, etc.).

While the present invention is disclosed by reference to the preferred embodiments and examples detailed above, it is to be understood that these examples are intended in an illustrative rather than in a limiting sense. It is contemplated that modifications and combinations will occur to those skilled in the art, which modifications and combinations will be within the spirit of the invention and the scope of the following claims.

Any and all patents, patent applications and printed publications referred to above are incorporated by reference.

What is claimed is:

1. A battery-powered motion control assembly for use with mobile computing, comprising:
   a motion control device comprising an emission module, including an illumination source, and a detection module, including a sensor to sense differences in reflectance from the illumination source;
   a battery pack connected to the motion control device to supply power thereto, the battery pack being capable of powering the motion control device;
   an interface facilitating at least data transmission between the motion control device and a mobile computing device connected thereto;
   the motion control device capable of determining from an input power level to the mobile computing device from the battery pack when a low power required condition exists; and
   the mobile computing device when coupled with the motion control device further implements:
   detecting existence of objects including objects comprising a number of pixels that meets a threshold number of pixels indicating reduced power consumption; and providing instructions to at least one of the emission module and the detection module to enter a low power mode of operation.

2. The assembly according to claim 1, wherein the motion control device generates inputs for transmission to the mobile computing device.

3. The assembly according to claim 2, wherein the inputs correspond to an attribute of a sensed object.

4. The assembly according to claim 1, wherein the battery pack and the motion control device are parts of an integral unit.

5. The assembly according to claim 4, wherein the interface includes a plug for connection to an electrical connector of a mobile device, and a cable connecting the plug to the motion control device.

6. The assembly according to claim 1, further comprising a protective case configured for mounting a mobile computing device, a portion of protective case carrying the motion control device, battery pack and coupler as a one-piece unit.

7. The assembly according to claim 1, the battery pack further comprising a coupler to electrically connect the battery pack to a solar panel.

8. The assembly according to claim 1, the motion control device further comprising:
an environmental filter to provide environmental information comprising an input power level and power source type.

9. The assembly according to claim 1, further including adapting detection of objects to at least one of an input power level and a power source type.

10. A motion control assembly for use with mobile computing, comprising:
a motion control device comprising an illumination source and detection module having one or more sensors to sense differences in reflectance from the illumination source;
a battery pack connected to the motion control device to supply power thereto, the battery pack being capable of powering the motion control device;
an interface facilitating at least data transmission between the motion control device and a mobile computing device connected thereto;
the motion control device capable of determining from an input power level to the mobile computing device from the battery pack when a low power required condition exists; and
the mobile computing device when coupled with the motion control device further implements:
detecting existence of objects including comprising a number of pixels that meets a threshold number of pixels indicating reduced power consumption; and
providing instructions to at least the detection module to enter a low power mode of operation.

11. A non-transitory computer readable memory storing instructions for operating a motion control assembly for use with mobile computing, the motion control assembly comprising a motion control device comprising an illumination source, a detection module having one or more sensors to sense differences in reflectance from the illumination source; a battery pack connected to the motion control device to supply power thereto, the battery pack being capable of powering the motion control device; and an interface facilitating at least data transmission between the motion control device and a mobile computing device connected thereto, which instructions, when executed by a processor of the motion control device implement:
determining from an input power level to the mobile computing device from the battery pack when a low power required condition exists;
detecting existence of objects comprising a number of pixels that meets a threshold number of pixels indicating reduced power consumption; and
providing instructions to at least the detection module to enter a low power mode of operation.

* * * * *